US012386995B2

(12) United States Patent
Johnston et al.

(10) Patent No.: US 12,386,995 B2
(45) Date of Patent: Aug. 12, 2025

(54) DATA CONSENT STORAGE AND MANAGEMENT SYSTEM AND METHOD

(71) Applicant: ResMed Inc., San Diego, CA (US)

(72) Inventors: Benjamin Peter Johnston, Sydney (AU); Jamie Graeme Wehbeh, Bella Vista (AU); Paul Anthony Green, Bella Vista (AU)

(73) Assignee: ResMed Inc., San Diego, CA (US)

( * ) Notice: Subject to any disclaimer, the term of this patent is extended or adjusted under 35 U.S.C. 154(b) by 486 days.

(21) Appl. No.: 17/607,809

(22) PCT Filed: Apr. 28, 2020

(86) PCT No.: PCT/US2020/030314
§ 371 (c)(1),
(2) Date: Oct. 29, 2021

(87) PCT Pub. No.: WO2020/223263
PCT Pub. Date: Nov. 5, 2020

(65) Prior Publication Data
US 2022/0198057 A1 Jun. 23, 2022

Related U.S. Application Data

(60) Provisional application No. 62/840,963, filed on Apr. 30, 2019.

(51) Int. Cl.
*G06F 21/62* (2013.01)
(52) U.S. Cl.
CPC ................................ *G06F 21/6245* (2013.01)

(58) Field of Classification Search
CPC .................................................. G06F 21/6245
See application file for complete search history.

(56) References Cited

U.S. PATENT DOCUMENTS

| 6,553,346 | B1 * | 4/2003 | Walker ................... G06Q 20/24 705/25 |
| 2002/0007284 | A1 * | 1/2002 | Schurenberg ......... H04L 69/329 705/2 |
| 2005/0165627 | A1 | 7/2005 | Fotsch et al. |

(Continued)

FOREIGN PATENT DOCUMENTS

| CN | 103649928 A | 3/2014 |
| CN | 108717861 A | 10/2018 |

(Continued)

OTHER PUBLICATIONS

International Search Report in International Patent Application No. PCT/US2020/030314 mailed Aug. 5, 2020 (4 pp.).

(Continued)

*Primary Examiner* — Dao Q Ho
(74) *Attorney, Agent, or Firm* — Nixon Peabody LLP

(57) ABSTRACT

Disclosed are systems and methods for managing consent to share data from a user device. In some examples, the system stores user identifiers referenced to the user's individual consent preferences. The consent preferences may include data types, data generating devices to which the user consents, types of third parties the user consents to share the data with and other consent preferences. Third parties may communicate with the system, and determine whether a user has consented to share their data.

16 Claims, 16 Drawing Sheets

(56) References Cited

U.S. PATENT DOCUMENTS

| | | | |
|---|---|---|---|
| 2014/0136237 A1 | 5/2014 | Anderson et al. | |
| 2014/0324549 A1* | 10/2014 | Chelap | G06Q 30/0206 |
| | | | 705/7.35 |
| 2015/0302150 A1* | 10/2015 | Mazar | G16H 40/63 |
| | | | 705/2 |
| 2016/0188801 A1* | 6/2016 | Tse | G16H 10/60 |
| | | | 705/51 |
| 2017/0132589 A1* | 5/2017 | Li | G06F 16/9535 |
| 2019/0361896 A1* | 11/2019 | Brunets | G06F 16/9535 |
| 2021/0334402 A1* | 10/2021 | Detchemendy | H04L 63/108 |
| 2022/0382907 A1* | 12/2022 | Siohan | G06F 21/6254 |
| 2023/0082046 A1* | 3/2023 | Isoda | G06Q 40/00 |
| | | | 705/307 |

FOREIGN PATENT DOCUMENTS

| | | |
|---|---|---|
| JP | 2002183350 A | 6/2002 |
| JP | 2005202462 A | 7/2005 |
| JP | 2007122464 A | 5/2007 |
| JP | 2017224212 A | 12/2017 |
| WO | 2013179654 A1 | 12/2013 |
| WO | 2016051790 A1 | 4/2016 |

OTHER PUBLICATIONS

Written Opinion in International Patent Application No. PCT/US2020/030314 mailed Aug. 5, 2020 (5 pp.).

West, John B., "Respiratory Physiology", 9th edition published 2012, Lippincott Williams & Wilkins.

* cited by examiner

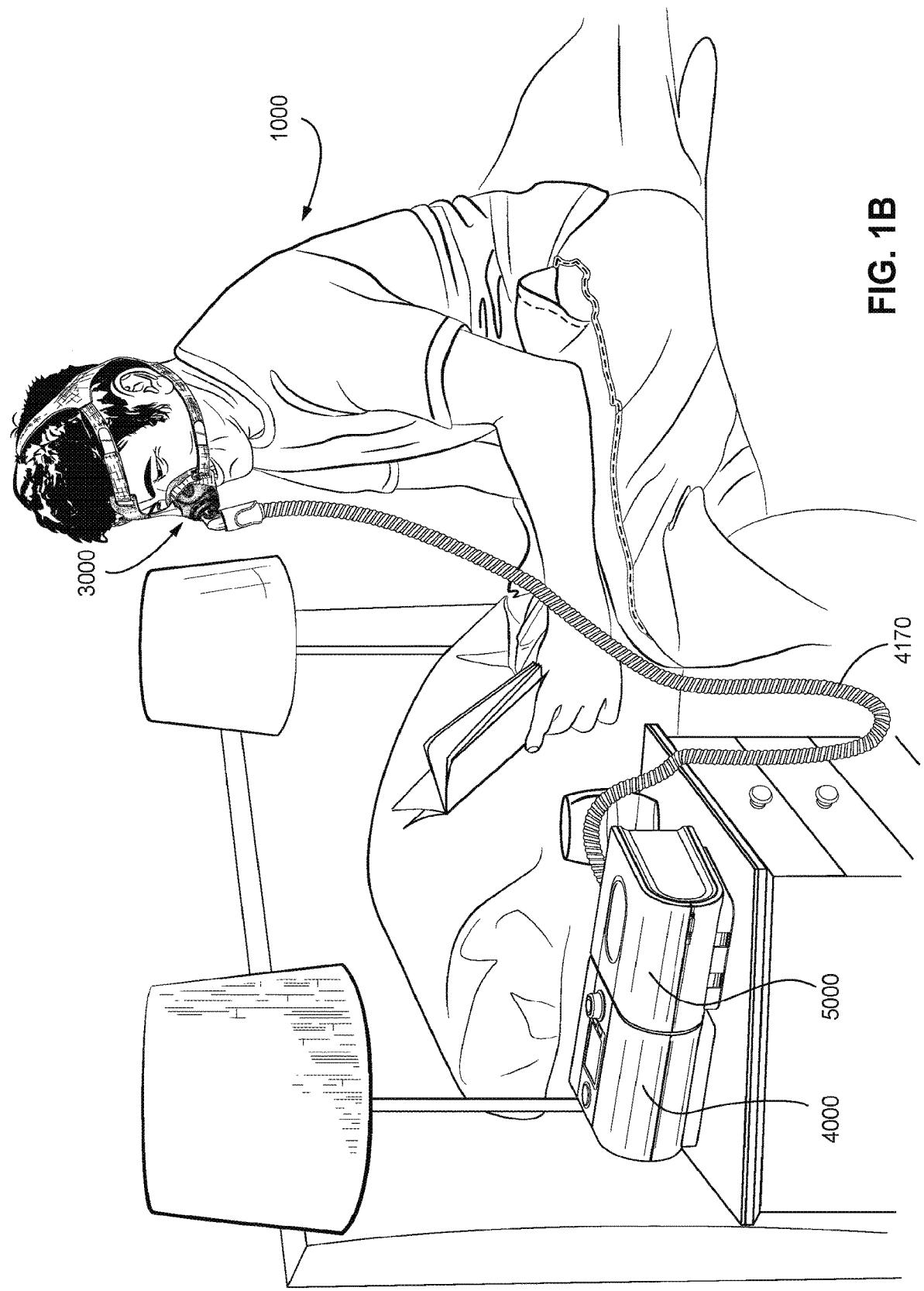

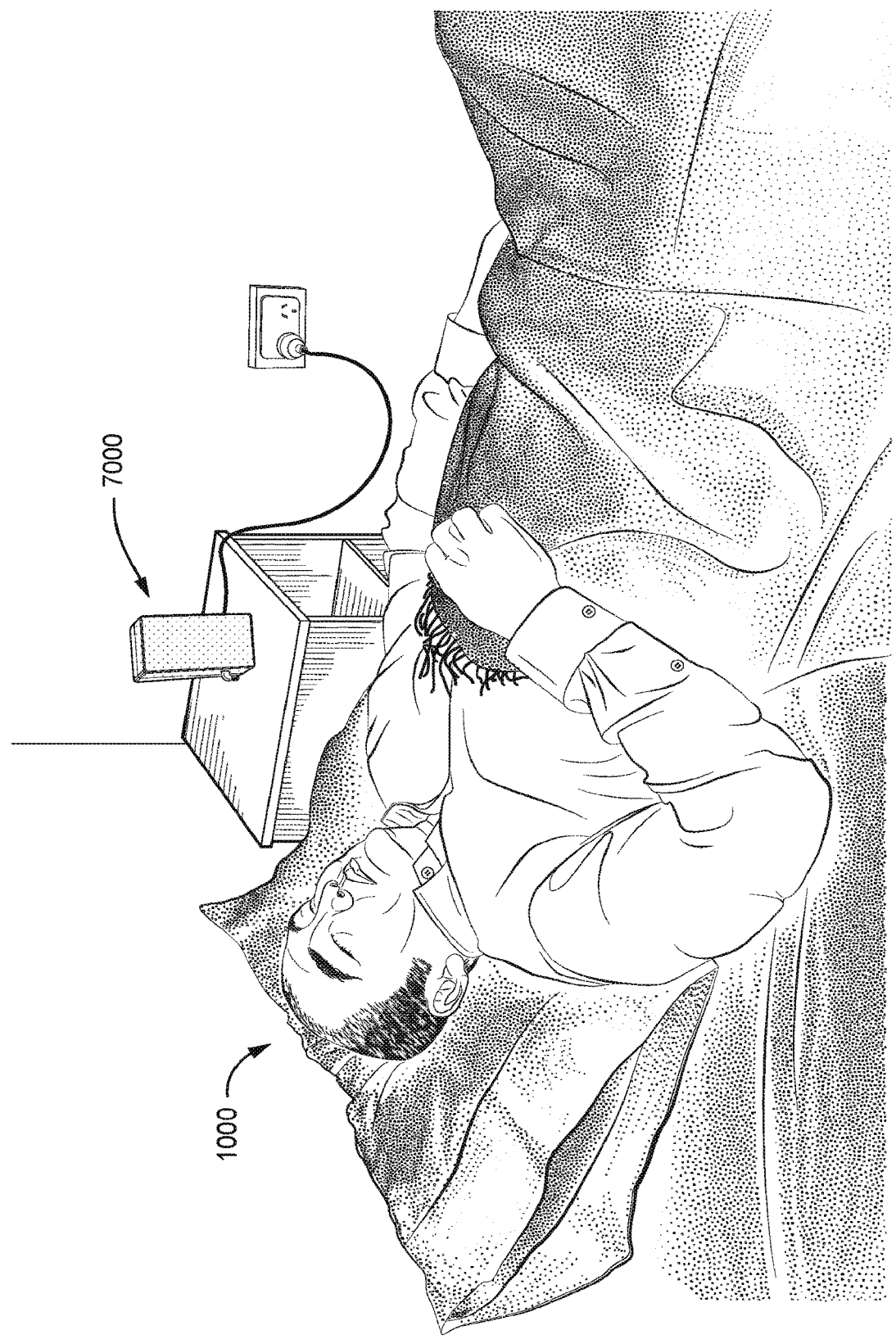

DATA CONSENT STORAGE AND MANAGEMENT SYSTEM AND METHOD

CROSS-REFERENCE TO RELATED APPLICATIONS

This application is a 371 National Phase Entry of International Patent Application No. PCT/US2020/030314, filed Apr. 28, 2020, which claims priority to and the benefit of U.S. Provisional Patent Application No. 62/840,963, filed Apr. 30, 2019, and entitled "Data Consent Storage and Management System and Method", the contents of which are incorporated herein by reference in their entirety.

COPYRIGHT DISCLOSURE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1 BACKGROUND OF THE TECHNOLOGY

1.1 Field of the Technology

The present technology relates to data sharing and managing consent and data flows between different entities and devices.

1.2 Description of the Related Art

Various medical devices, wearables, and other devices may generate user data. Third parties or data consumers may be interested in obtaining that data, as the user's data (or aggregating data for several users) may have value to a third party consumer. However, users (or patients as described herein) must consent to their data being shared and used by third parties.

Devices that may generate user data include respiratory therapy devices, wearables, mobile devices, and other connected devices. These may include a variety of respiratory therapy devices, including CPAP devices and related software and similar devices.

1.2.1 Human Respiratory System and its Disorders

The respiratory system of the body facilitates gas exchange. The nose and mouth form the entrance to the airways of a patient.

The airways include a series of branching tubes, which become narrower, shorter and more numerous as they penetrate deeper into the lung. The prime function of the lung is gas exchange, allowing oxygen to move from the inhaled air into the venous blood and carbon dioxide to move in the opposite direction. The trachea divides into right and left main bronchi, which further divide eventually into terminal bronchioles. The bronchi make up the conducting airways, and do not take part in gas exchange. Further divisions of the airways lead to the respiratory bronchioles, and eventually to the alveoli. The alveolated region of the lung is where the gas exchange takes place, and is referred to as the respiratory zone. See "Respiratory Physiology", by John B. West, Lippincott Williams & Wilkins, 9th edition published 2012.

A range of respiratory disorders exist. Certain disorders may be characterised by particular events, e.g. apneas, hypopneas, and hyperpneas.

Examples of respiratory disorders include Obstructive Sleep Apnea (OSA), Cheyne-Stokes Respiration (CSR), respiratory insufficiency, Obesity Hyperventilation Syndrome (OHS), Chronic Obstructive Pulmonary Disease (COPD), Neuromuscular Disease (NMD) and Chest wall disorders.

1.2.2 Therapies

Various therapies, such as Continuous Positive Airway Pressure (CPAP) therapy, Non-invasive ventilation (NIV) and Invasive ventilation (IV) have been used to treat one or more of the above respiratory disorders.

1.2.2.1 Respiratory Pressure Therapies

Continuous Positive Airway Pressure (CPAP) therapy has been used to treat Obstructive Sleep Apnea (OSA). The mechanism of action is that continuous positive airway pressure acts as a pneumatic splint and may prevent upper airway occlusion, such as by pushing the soft palate and tongue forward and away from the posterior oropharyngeal wall. Treatment of OSA by CPAP therapy may be voluntary, and hence patients may elect not to comply with therapy if they find devices used to provide such therapy one or more of: uncomfortable, difficult to use, expensive and aesthetically unappealing.

Non-invasive ventilation (NIV) provides ventilatory support to a patient through the upper airways to assist the patient breathing and/or maintain adequate oxygen levels in the body by doing some or all of the work of breathing. The ventilatory support is provided via a non-invasive patient interface. NIV has been used to treat CSR and respiratory failure, in forms such as OHS, COPD, NMD and Chest Wall disorders. In some forms, the comfort and effectiveness of these therapies may be improved.

Invasive ventilation (IV) provides ventilatory support to patients that are no longer able to effectively breathe themselves and may be provided using a tracheostomy tube. In some forms, the comfort and effectiveness of these therapies may be improved.

1.2.2.2 Flow Therapies

Not all respiratory therapies aim to deliver a prescribed therapy pressure. Some respiratory therapies aim to deliver a prescribed respiratory volume, possibly by targeting a flow rate profile over a targeted duration. In other cases, the interface to the patient's airways is 'open' (unsealed) and the respiratory therapy may only supplement the patient's own spontaneous breathing. In one example, High Flow therapy (HFT) is the provision of a continuous, heated, humidified flow of air to an entrance to the airway through an unsealed or open patient interface at a "treatment flow rate" that is held approximately constant throughout the respiratory cycle. The treatment flow rate is nominally set to exceed the patient's peak inspiratory flow rate. HFT has been used to treat OSA, CSR, COPD and other respiratory disorders. One mechanism of action is that the high flow rate of air at the airway entrance improves ventilation efficiency by flushing, or washing out, expired $CO_2$ from the patient's anatomical deadspace. HFT is thus sometimes referred to as a deadspace therapy (DST). In other flow therapies, the treatment flow rate may follow a profile that varies over the respiratory cycle.

Another form of flow therapy is long-term oxygen therapy (LTOT) or supplemental oxygen therapy. Doctors may prescribe a continuous flow of oxygen enriched gas at a specified oxygen concentration (from 21%, the oxygen fraction in ambient air, to 100%) at a specified flow rate (e.g., 1 litre per minute (LPM), 2 LPM, 3 LPM, etc.) to be delivered to the patient's airway.

1.2.2.3 Supplementary Oxygen

For certain patients, oxygen therapy may be combined with a respiratory pressure therapy or HFT by adding supplementary oxygen to the pressurised flow of air. When oxygen is added to respiratory pressure therapy, this is referred to as RPT with supplementary oxygen. When oxygen is added to HFT, the resulting therapy is referred to as HFT with supplementary oxygen.

1.2.3 Treatment Systems

These respiratory therapies may be provided by a therapy system or device. Such systems and devices may also be used to screen, diagnose, or monitor a condition without treating it.

A respiratory therapy system may comprise a Respiratory Pressure Therapy Device (RPT device), an air circuit, a humidifier, a patient interface, an oxygen source, and data management.

1.2.3.1 Patient Interface

A patient interface may be used to interface respiratory equipment to its wearer, for example by providing a flow of air to an entrance to the airways. The flow of air may be provided via a mask to the nose and/or mouth, a tube to the mouth or a tracheostomy tube to the trachea of a patient. Depending upon the therapy to be applied, the patient interface may form a seal, e.g., with a region of the patient's face, to facilitate the delivery of gas at a pressure at sufficient variance with ambient pressure to effect therapy, e.g., at a positive pressure of about 10 cmH2O relative to ambient pressure. For other forms of therapy, such as the delivery of oxygen, the patient interface may not include a seal sufficient to facilitate delivery to the airways of a supply of gas at a positive pressure of about 10 cmH2O.

1.2.3.2 Respiratory Pressure Therapy (RPT) Device

A respiratory pressure therapy (RPT) device may be used individually or as part of a system to deliver one or more of a number of therapies described above, such as by operating the device to generate a flow of air for delivery to an interface to the airways. The flow of air may be pressure-controlled (for respiratory pressure therapies) or flow-controlled (for flow therapies such as HFT). Thus RPT devices may also act as flow therapy devices. Examples of RPT devices include CPAP devices and ventilators.

Air pressure generators are known in a range of applications, e.g. industrial-scale ventilation systems. However, air pressure generators for medical applications have particular requirements not fulfilled by more generalised air pressure generators, such as the reliability, size and weight requirements of medical devices. In addition, even devices designed for medical treatment may suffer from shortcomings, pertaining to one or more of: comfort, noise, ease of use, efficacy, size, weight, manufacturability, cost, and reliability.

An example of the special requirements of certain RPT devices is acoustic noise.

One known RPT device used for treating sleep disordered breathing is the S9 Sleep Therapy System, manufactured by ResMed Limited. Another example of an RPT device is a ventilator. Ventilators such as the ResMed Stellar™ Series of Adult and Paediatric Ventilators may provide support for invasive and non-invasive non-dependent ventilation for a range of patients for treating a number of conditions such as but not limited to NMD, OHS and COPD.

The ResMed Elisée™ 150 ventilator and ResMed VS III™ ventilator may provide support for invasive and non-invasive dependent ventilation suitable for adult or paediatric patients for treating a number of conditions. These ventilators provide volumetric and barometric ventilation modes with a single or double limb circuit. RPT devices typically comprise a pressure generator, such as a motor-driven blower or a compressed gas reservoir, and are configured to supply a flow of air to the airway of a patient. In some cases, the flow of air may be supplied to the airway of the patient at positive pressure. The outlet of the RPT device is connected via an air circuit to a patient interface such as those described above.

1.2.3.3 Data Management

There may be clinical reasons to obtain data to determine whether the patient prescribed with respiratory therapy has been "compliant", e.g. that the patient has used their RPT device according to one or more "compliance rules". One example of a compliance rule for CPAP therapy is that a patient, in order to be deemed compliant, is required to use the RPT device for at least four hours a night for at least 21 of 30 consecutive days. In order to determine a patient's compliance, a provider of the RPT device, such as a health care provider, may manually obtain data describing the patient's therapy using the RPT device, calculate the usage over a predetermined time period, and compare with the compliance rule. Once the health care provider has determined that the patient has used their RPT device according to the compliance rule, the health care provider may notify a third party that the patient is compliant.

There may be other aspects of a patient's therapy that would benefit from communication of therapy data to a third party or external system.

Existing processes to communicate and manage such data can be one or more of costly, time-consuming, and error-prone.

1.2.3.4 Vent Technologies

Some forms of treatment systems may include a vent to allow the washout of exhaled carbon dioxide. The vent may allow a flow of gas from an interior space of a patient interface, e.g., the plenum chamber, to an exterior of the patient interface, e.g., to ambient.

1.2.4 Screening, Diagnosis, and Monitoring Systems

Polysomnography (PSG) is a conventional system for diagnosis and monitoring of cardio-pulmonary disorders, and typically involves expert clinical staff to apply the system. PSG typically involves the placement of 15 to 20 contact sensors on a patient in order to record various bodily signals such as electroencephalography (EEG), electrocardiography (ECG), electrooculograpy (EOG), electromyography (EMG), etc. PSG for sleep disordered breathing has involved two nights of observation of a patient in a clinic, one night of pure diagnosis and a second night of titration of treatment parameters by a clinician. PSG is therefore expensive and inconvenient. In particular, it is unsuitable for home screening/diagnosis/monitoring of sleep disordered breathing.

Screening and diagnosis generally describe the identification of a condition from its signs and symptoms. Screening typically gives a true/false result indicating whether or not a patient's SDB is severe enough to warrant further investigation, while diagnosis may result in clinically actionable information. Screening and diagnosis tend to be one-off processes, whereas monitoring the progress of a condition can continue indefinitely. Some screening/diagnosis systems are suitable only for screening/diagnosis, whereas some may also be used for monitoring.

Clinical experts may be able to screen, diagnose, or monitor patients adequately based on visual observation of PSG signals. However, there are circumstances where a clinical expert may not be available, or a clinical expert may not be affordable. Different clinical experts may disagree on a patient's condition. In addition, a given clinical expert may apply a different standard at different times.

2 BRIEF SUMMARY OF THE TECHNOLOGY

The present technology is directed towards managing consent for a user's data and devices with respect to third parties.

A first aspect of the present technology relates to various devices and software that generate user data that a user may consent to share. These includes apparatuses, methods, and software used in the screening, diagnosis, monitoring, amelioration, treatment or prevention of a respiratory disorder.

An aspect of certain forms of the present technology is to manage consent and data flows with respect to data relating to methods and/or apparatus that improve the compliance of patients with respiratory therapy.

One form of the present technology comprises servers, databases, and software for managing consent of user devices and the data generated by the user devices that may be sent to third parties. Currently, users must review and consent to a long list of terms and conditions relating to sharing their data when they sign up for a new service that requires sharing of data in order to set up an account. Users or patients are unlikely to read these terms and conditions, and have little or no way of revoking their consent to share data once they grant it. Furthermore, users have little or no way of monetizing any of their valuable data, and therefore, much of user's valuable patient and other data is not monetized for the user, and therefore ultimately ends up not being shared. Additionally, users rarely understand the consent terms, and have no means of selectively choosing the terms they consent to, or selecting a sub-set of parties, end-users or ways in which they consent to share their data.

Accordingly, there are no systems and methods for effectively managing a user's consent to share its data from its devices, software programs, accounts, and other data sources with third party data consumers. Accordingly, the inventor(s) have developed systems and methods to help manage consent and/or the data flow between user devices and third party data consumers.

In some examples, this may include a consent broker server and database that stores unique identifiers representative of each user that are referenced to the user's individual consent preferences. The consent preferences may include data types, data generating devices to which the user consents, types of third parties the user consents to share the data with and other consent preferences. This will allow a third party to communicate with the consent broker, and determine whether a user has consented to share their data. The third party could then store that consent, and directly download data from the user and use the data based on the user's consented terms.

In another aspect of one form of the present technology, the broker could act as the intermediary of the data transfer between the third party and the user device. For instance, the consent broker could present an API address to the third party receiving the data, and could manage the data flow between the user and the third party. This will allow the consent broker to easily switch off access to the API once the user has decided to terminate consent.

In another aspect of one form of the present technology, the broker may download and store data from several different users to create a data warehouse and marketplace for third parties to download data. For instance, a third party may send a request for a certain type of data to the broker for a certain type of use. The broker may then query the database to determine how much of that type of data is available for that use, and send the market price back to the third party. Accordingly, the third party may then agree to receive the data at that price, and the broker could send the data to the third party.

The methods, systems, devices and apparatus described may be implemented so as to improve the functionality of a processor, such as a processor of a specific purpose computer, respiratory monitor and/or a respiratory therapy apparatus. Moreover, the described methods, systems, devices and apparatus can provide improvements in the technological field of automated management, monitoring and/or treatment of respiratory conditions, including, for example, sleep disordered breathing.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

3 BRIEF DESCRIPTION OF THE DRAWINGS

The present technology is illustrated by way of example, and not by way of limitation, in the figures of the accompanying drawings, in which like reference numerals refer to similar elements including:

3.1 Treatment Systems

FIG. 1A shows a system including a patient 1000 wearing a patient interface 3000, in the form of nasal pillows, receiving a supply of air at positive pressure from an RPT device 4000. Air from the RPT device 4000 is humidified in a humidifier 5000, and passes along an air circuit 4170 to the patient 1000. A bed partner 1100 is also shown. The patient is sleeping in a supine sleeping position.

FIG. 1B shows a system including a patient 1000 wearing a patient interface 3000, in the form of a nasal mask, receiving a supply of air at positive pressure from an RPT device 4000. Air from the RPT device is humidified in a humidifier 5000, and passes along an air circuit 4170 to the patient 1000.

FIG. 1C shows a system including a patient 1000 wearing a patient interface 3000, in the form of a full-face mask, receiving a supply of air at positive pressure from an RPT device 4000. Air from the RPT device is humidified in a humidifier 5000, and passes along an air circuit 4170 to the patient 1000. The patient is sleeping in a side sleeping position.

3.2 Respiratory System and Facial Anatomy

FIG. 2A shows an overview of a human respiratory system including the nasal and oral cavities, the larynx, vocal folds, oesophagus, trachea, bronchus, lung, alveolar sacs, heart and diaphragm.

3.3 Patient Interface

FIG. 3A shows a patient interface in the form of a nasal mask in accordance with one form of the present technology.

3.4 RPT Device

FIG. 4A shows an RPT device in accordance with one form of the present technology.

FIG. 4B is a schematic diagram of the pneumatic path of an RPT device in accordance with one form of the present technology. The directions of upstream and downstream are indicated with reference to the blower and the patient interface. The blower is defined to be upstream of the patient interface and the patient interface is defined to be downstream of the blower, regardless of the actual flow direction at any particular moment. Items which are located within the pneumatic path between the blower and the patient interface are downstream of the blower and upstream of the patient interface.

3.5 Humidifier

3.6 Breathing Waveforms

Figure 6A:
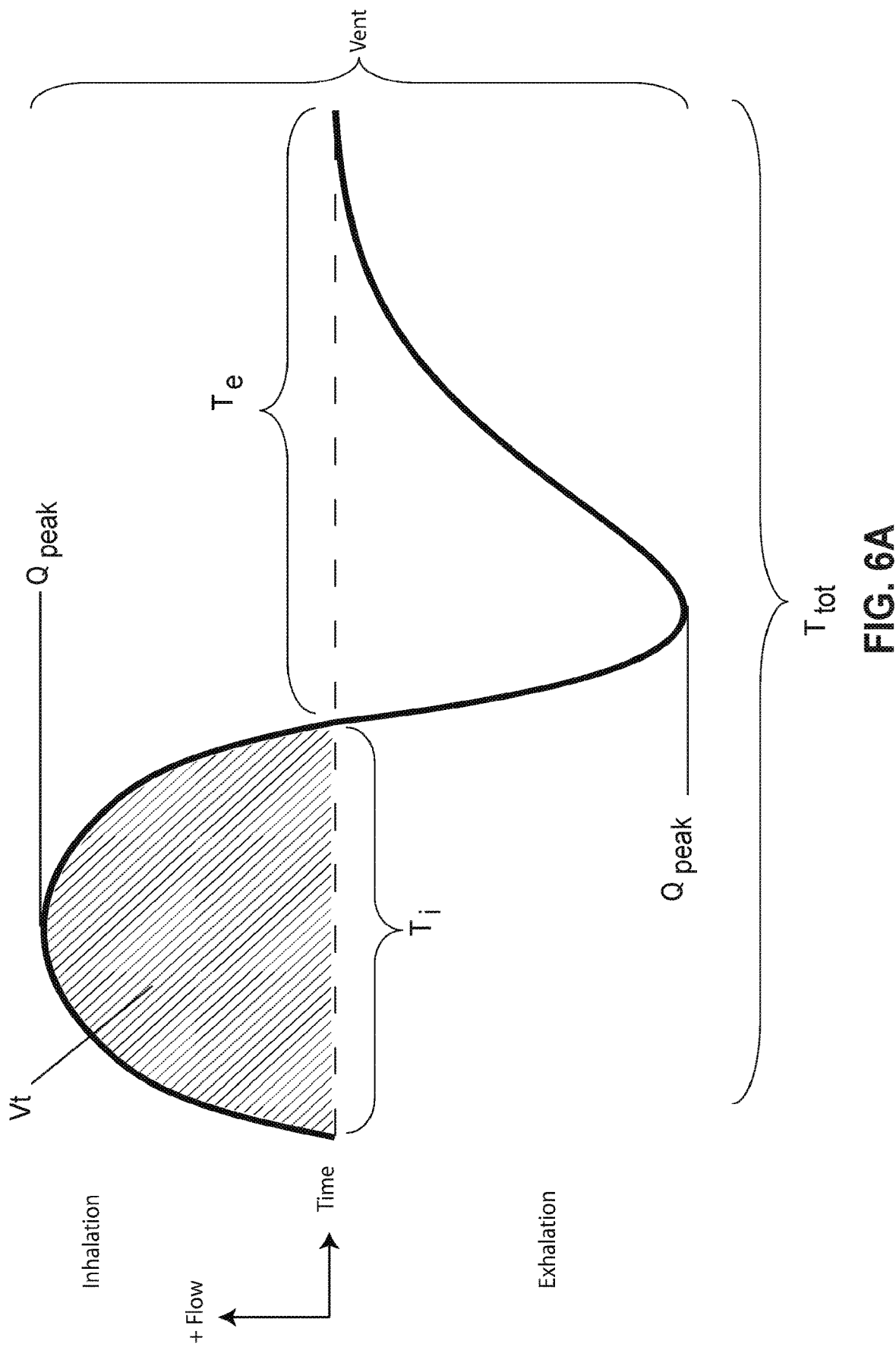

FIG. 6A shows a model typical breath waveform of a person while sleeping.

3.7 Screening, Diagnosis and Monitoring Systems

Figure 7A:
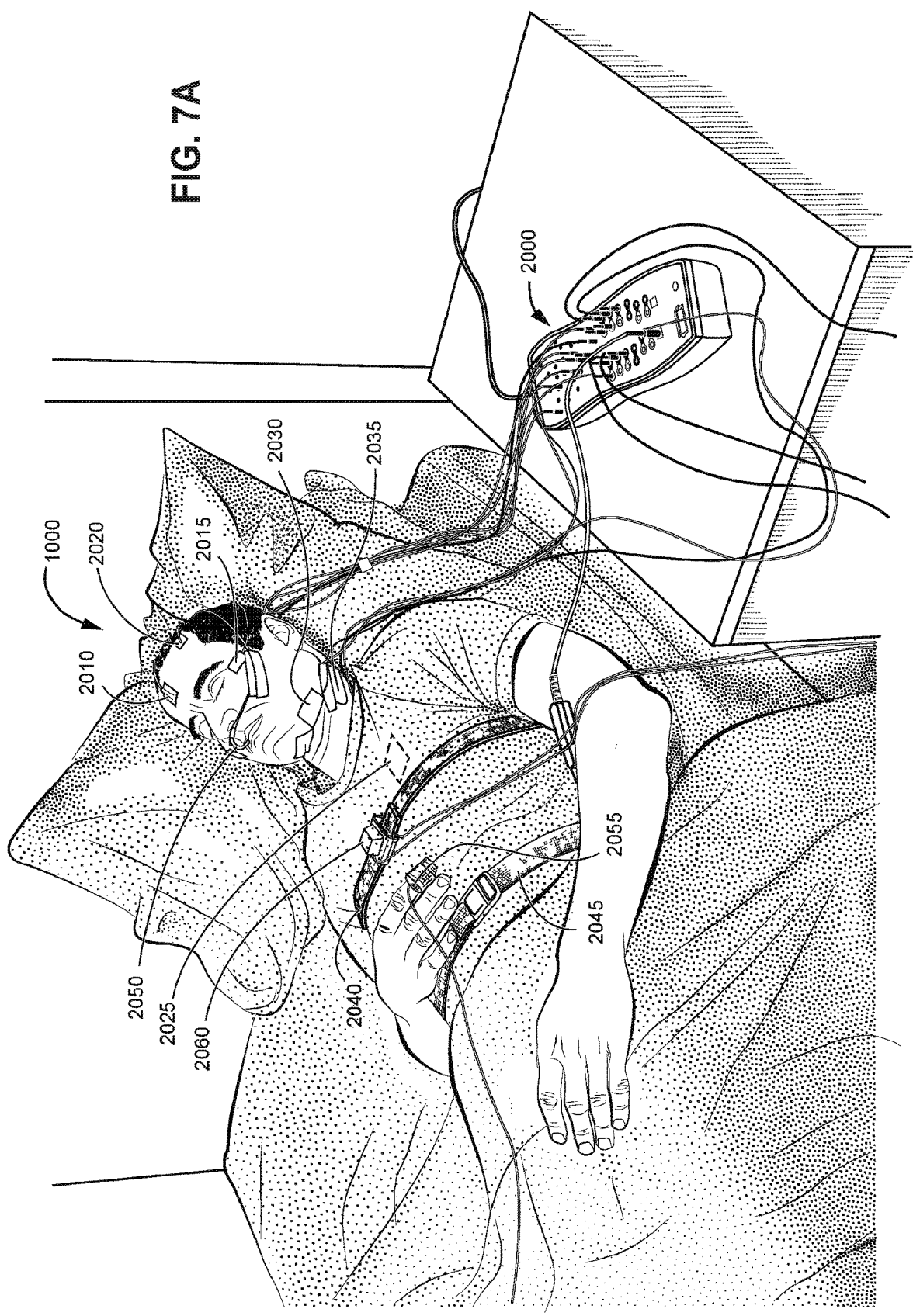

FIG. 7A shows a patient undergoing polysomnography (PSG). The patient is sleeping in a supine sleeping position.

FIG. 7B shows a monitoring apparatus for monitoring the condition of a patient. The patient is sleeping in a supine sleeping position.

3.8 Data Transmission

Figure 8:
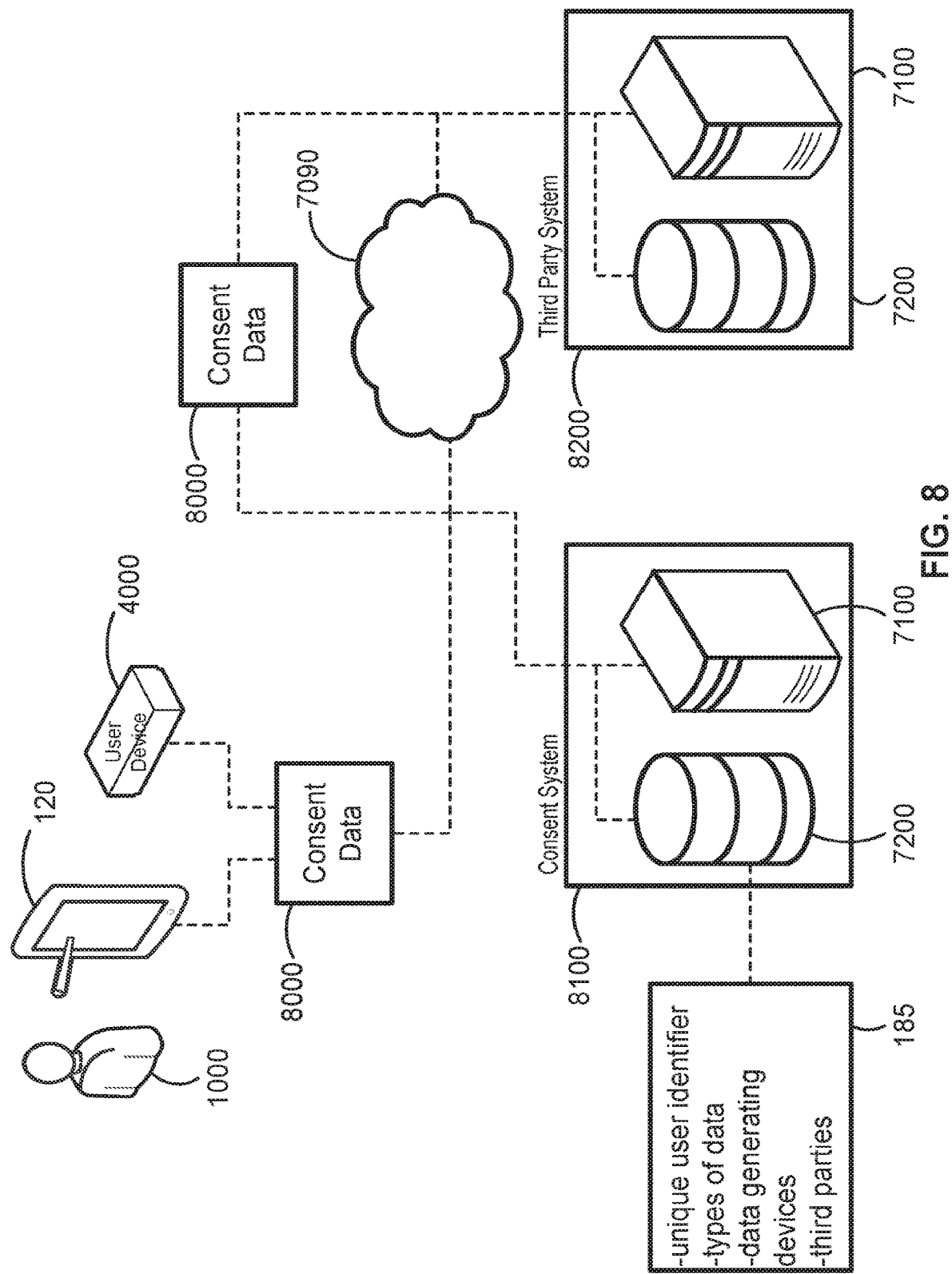

FIG. 8 shows a block diagram of a system for storing and managing consent.

Figure 9:
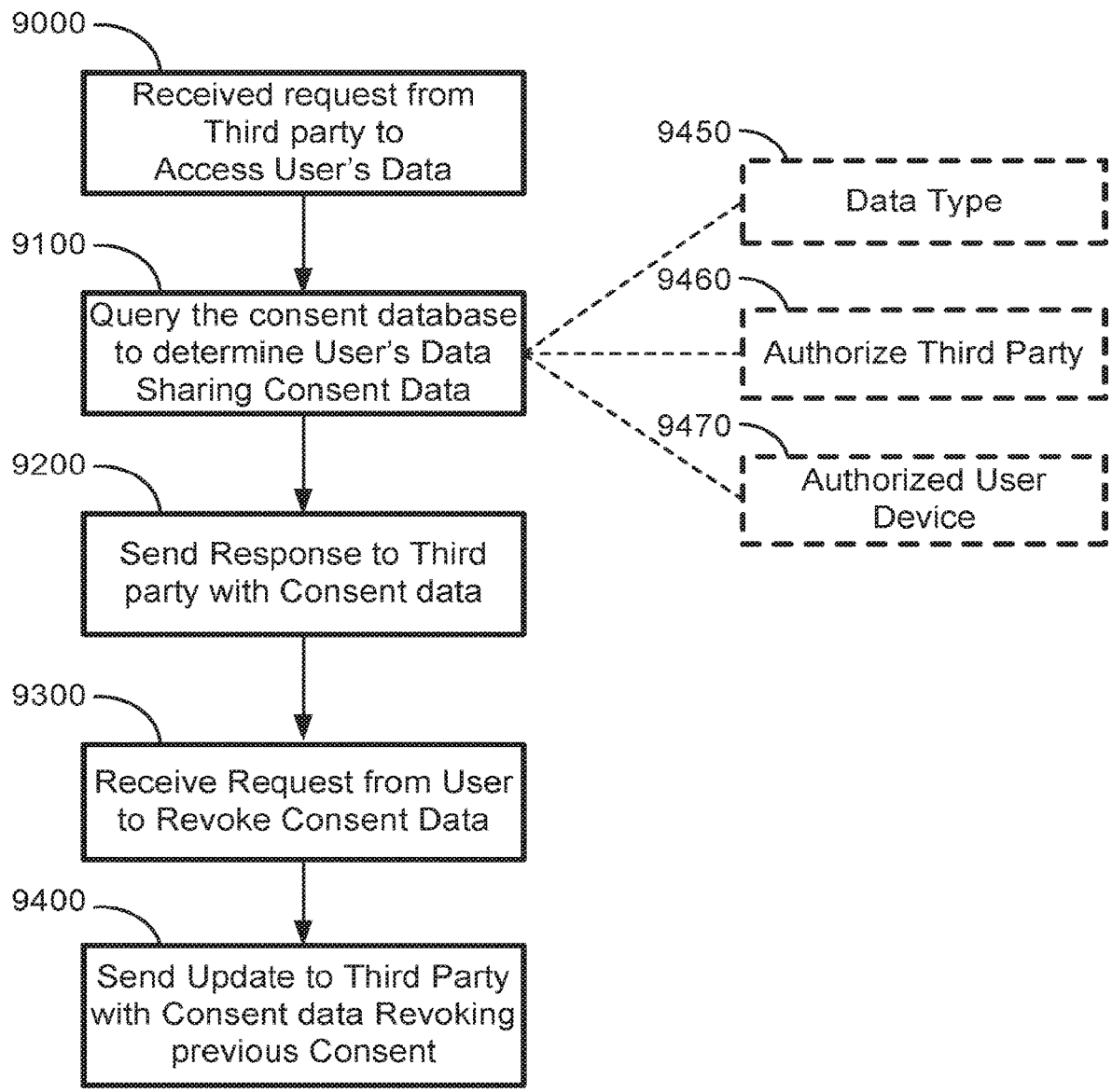

FIG. 9 shows a flow chart of an example method for managing consent.

Figure 10:
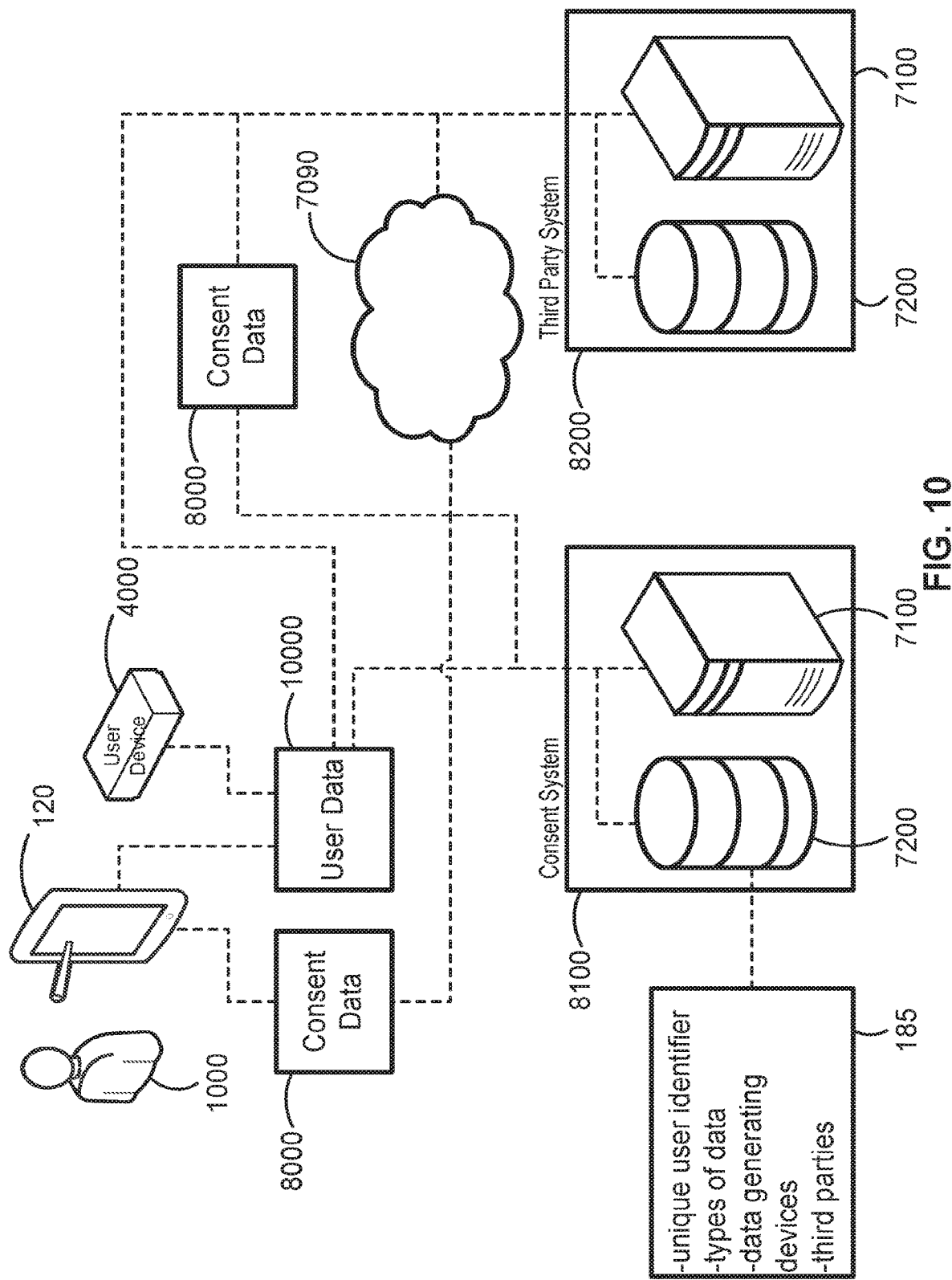

FIG. 10 shows a block diagram of a system for storing and managing consent.

Figure 11:
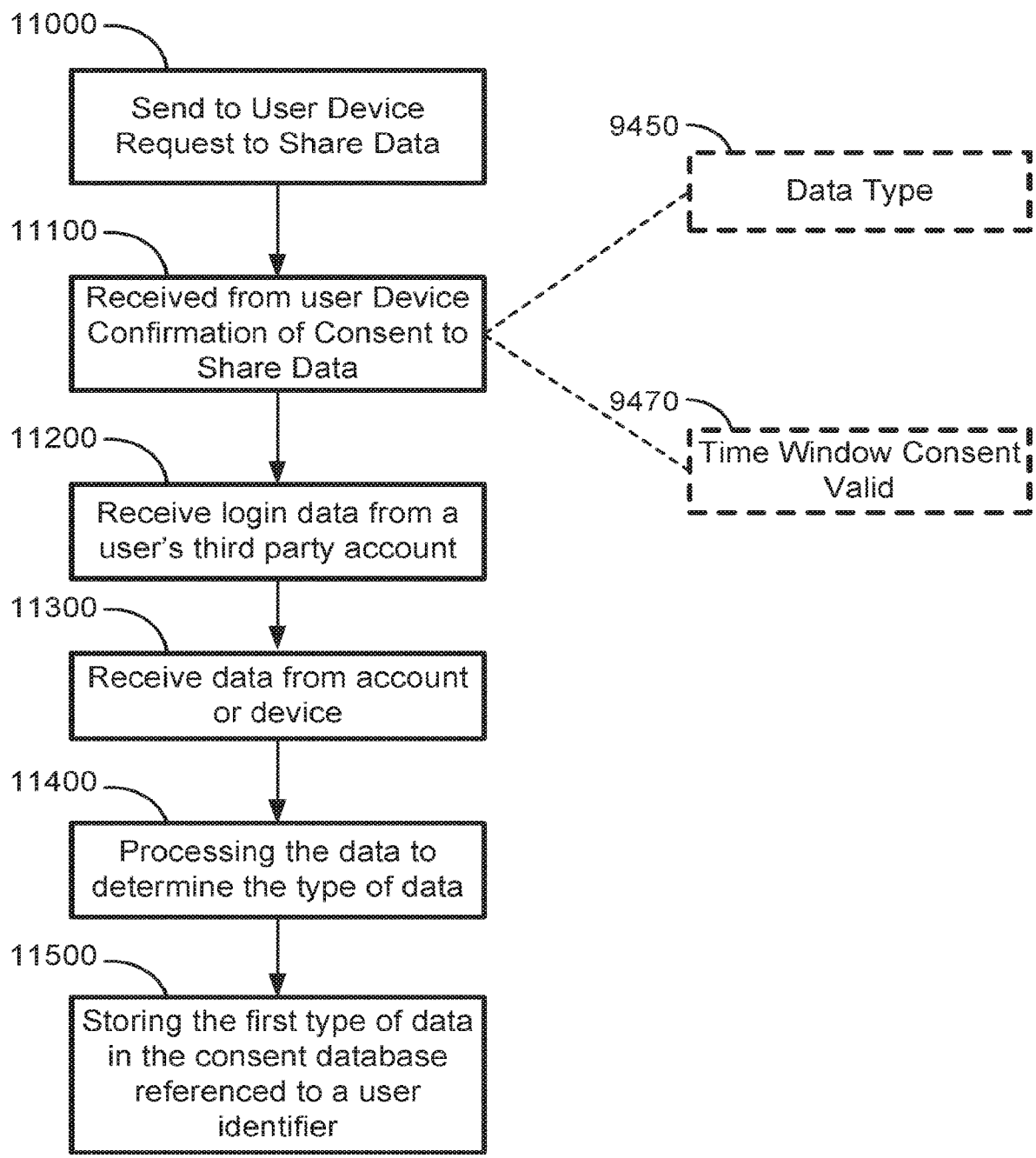

FIG. 11 shows a flow chart of an example method for managing consent and data.

Figure 12:
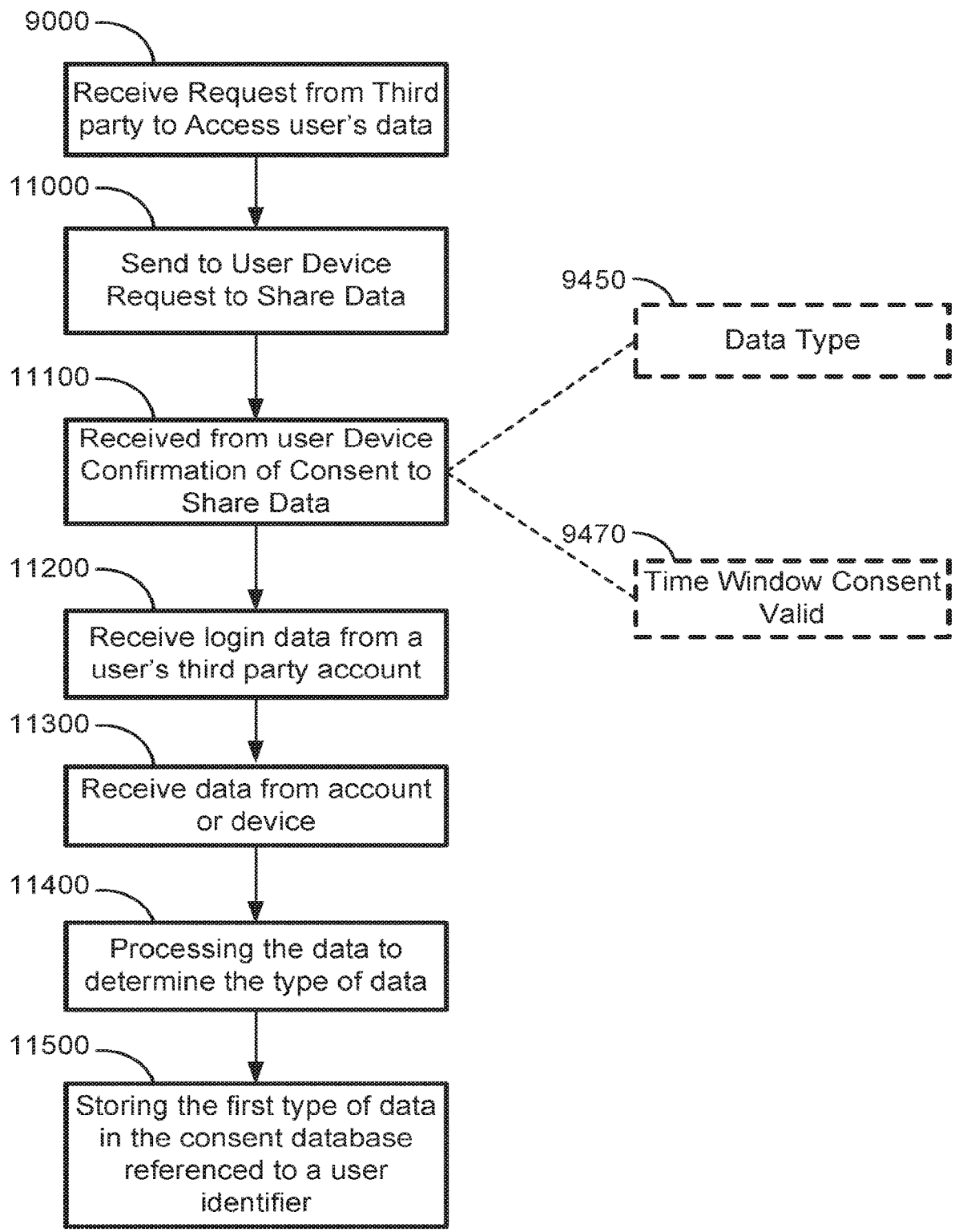

FIG. 12 shows a flow chart of an example method for managing consent and data.

4 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

4.1 Therapy

In one form, the present technology comprises a method for treating a respiratory disorder comprising the step of applying positive pressure to the entrance of the airways of a patient 1000.

In certain examples of the present technology, a supply of air at positive pressure is provided to the nasal passages of the patient via one or both nares.

In certain examples of the present technology, mouth breathing is limited, restricted or prevented.

4.2 Treatment Systems

In one form, the present technology comprises an apparatus or device for treating a respiratory disorder. The apparatus or device may comprise an RPT device 4000 for supplying pressurised air to the patient 1000 via an air circuit 4170 to a patient interface 3000 or 3800.

4.3 Patient Interface

A non-invasive patient interface 3000 in accordance with one aspect of the present technology comprises the following functional aspects: a seal-forming structure 3100, a plenum chamber 3200, a positioning and stabilising structure 3300, a vent 3400, one form of connection port 3600 for connection to air circuit 4170, and a forehead support 3700. In some forms a functional aspect may be provided by one or more physical components. In some forms, one physical component may provide one or more functional aspects. In use the seal-forming structure 3100 is arranged to surround an entrance to the airways of the patient so as to facilitate the supply of air at positive pressure to the airways.

An unsealed patient interface 3800, in the form of a nasal cannula, includes nasal prongs 3810a, 3810b which can deliver air to respective nares of the patient 1000. Such nasal prongs do not generally form a seal with the inner or outer skin surface of the nares. The air to the nasal prongs may be delivered by one or more air supply lumens 3820a, 3820b that are coupled with the nasal cannula 3800. The lumens 3820a, 3820b lead from the nasal cannula 3800 lead to an RT device that generates the flow of air at high flow rates. The "vent" at the unsealed patient interface 3800, through which excess airflow escapes to ambient, is the passage between the end of the prongs 3810a and 3810b of the cannula 3800 via the patient's nares to atmosphere.

4.4 RPT Device

An RPT device 4000 in accordance with one aspect of the present technology comprises mechanical, pneumatic, and/or electrical components and is configured to execute one or more algorithms 4300, such as any of the methods, in whole or in part, described herein. The RPT device 4000 may be configured to generate a flow of air for delivery to a patient's airways, such as to treat one or more of the respiratory conditions described elsewhere in the present document.

4.4.1 RPT Device Electrical Components

4.4.1.1 Input Devices

In one form of the present technology, an RPT device 4000 includes one or more input devices 4220 in the form of buttons, switches or dials to allow a person to interact with the device. The buttons, switches or dials may be physical devices, or software devices accessible via a touch screen. The buttons, switches or dials may, in one form, be physically connected to the external housing 4010, or may, in another form, be in wireless communication with a receiver that is in electrical connection to the central controller 4230.

In one form, the input device 4220 may be constructed and arranged to allow a person to select a value and/or a menu option.

4.4.1.2 Central Controller

In one form of the present technology, the central controller 4230 is one or a plurality of processors suitable to control an RPT device 4000.

Suitable processors may include an x86 INTEL processor, a processor based on ARM® Cortex®-M processor from ARM Holdings such as an STM32 series microcontroller from ST MICROELECTRONIC. In certain alternative forms of the present technology, a 32-bit RISC CPU, such as an STR9 series microcontroller from ST MICROELECTRONICS or a 16-bit RISC CPU such as a processor from the MSP430 family of microcontrollers, manufactured by TEXAS INSTRUMENTS may also be suitable.

In one form of the present technology, the central controller 4230 is a dedicated electronic circuit.

In one form, the central controller 4230 is an application-specific integrated circuit. In another form, the central controller 4230 comprises discrete electronic components.

The central controller 4230 may be configured to receive input signal(s) from one or more transducers 4270, one or more input devices 4220, and the humidifier 5000.

The central controller 4230 may be configured to provide output signal(s) to one or more of an output device 4290, a therapy device controller 4240, a data communication interface 4280, and the humidifier 5000.

In some forms of the present technology, the central controller 4230 is configured to implement the one or more methodologies described herein, such as the one or more algorithms 4300 expressed as computer programs stored in a non-transitory computer readable storage medium, such as memory 4260. In some forms of the present technology, the central controller 4230 may be integrated with an RPT device 4000. However, in some forms of the present technology, some methodologies may be performed by a remotely located device. For example, the remotely located device may determine control settings for a ventilator or detect respiratory related events by analysis of stored data such as from any of the sensors described herein.

4.4.1.3 Clock

The RPT device 4000 may include a clock 4232 that is connected to the central controller 4230.

4.4.1.4 Therapy Device Controller

In one form of the present technology, therapy device controller 4240 is a therapy control module 4330 that forms part of the algorithms 4300 executed by the central controller 4230.

In one form of the present technology, therapy device controller 4240 is a dedicated motor control integrated circuit. For example, in one form a MC33035 brushless DC motor controller, manufactured by ONSEMI is used.

4.4.1.5 Protection Circuits

The one or more protection circuits 4250 in accordance with the present technology may comprise an electrical protection circuit, a temperature and/or pressure safety circuit.

4.4.1.6 Memory

In accordance with one form of the present technology the RPT device 4000 includes memory 4260, e.g., non-volatile memory. In some forms, memory 4260 may include battery powered static RAM. In some forms, memory 4260 may include volatile RAM.

Memory 4260 may be located on the PCBA 4202. Memory 4260 may be in the form of EEPROM, or NAND flash.

Additionally or alternatively, RPT device 4000 includes a removable form of memory 4260, for example a memory card made in accordance with the Secure Digital (SD) standard.

In one form of the present technology, the memory 4260 acts as a non-transitory computer readable storage medium on which is stored computer program instructions expressing the one or more methodologies described herein, such as the one or more algorithms 4300.

4.4.1.7 Data Communication Systems

In one form of the present technology, a data communication interface 4280 is provided, and is connected to the central controller 4230. Data communication interface 4280 may be connectable to a remote external communication network 4282 and/or a local external communication network 4284. The remote external communication network 4282 may be connectable to a remote external device 4286. The local external communication network 4284 may be connectable to a local external device 4288.

In one form, data communication interface 4280 is part of the central controller 4230. In another form, data communication interface 4280 is separate from the central controller 4230, and may comprise an integrated circuit or a processor.

In one form, remote external communication network 4282 is the Internet. The data communication interface 4280 may use wired communication (e.g. via Ethernet, or optical fibre) or a wireless protocol (e.g. CDMA, GSM, LTE) to connect to the Internet.

In one form, local external communication network 4284 utilises one or more communication standards, such as Bluetooth, or a consumer infrared protocol.

In one form, remote external device 4286 is one or more computers, for example a cluster of networked computers. In one form, remote external device 4286 may be virtual computers, rather than physical computers. In either case, such a remote external device 4286 may be accessible to an appropriately authorised person such as a clinician.

The local external device 4288 may be a personal computer, mobile phone, tablet or remote control.

4.4.2 RPT Device Algorithms

As mentioned above, in some forms of the present technology, the central controller 4230 may be configured to implement one or more algorithms 4300 expressed as computer programs stored in a non-transitory computer readable storage medium, such as memory 4260. The algorithms 4300 are generally grouped into groups referred to as modules.

4.4.2.1 Pre-Processing Module

A pre-processing module 4310 in accordance with one form of the present technology receives as an input a signal from a transducer 4270, for example a flow rate sensor 4274 or pressure sensor 4272, and performs one or more process steps to calculate one or more output values that will be used as an input to another module, for example a therapy engine module 4320.

In one form of the present technology, the output values include the interface pressure Pm, the respiratory flow rate Qr, and the leak flow rate Ql.

In various forms of the present technology, the pre-processing module 4310 comprises one or more of the following algorithms: interface pressure estimation 4312, vent flow rate estimation 4314, leak flow rate estimation 4316, and respiratory flow rate estimation 4318.

4.4.2.2 Therapy Engine Module

In one form of the present technology, a therapy engine module 4320 receives as inputs one or more of a pressure, Pm, in a patient interface 3000 or 3800, and a respiratory flow rate of air to a patient, Qr, and provides as an output one or more therapy parameters.

In one form of the present technology, a therapy parameter is a treatment pressure Pt.

In one form of the present technology, therapy parameters are one or more of an amplitude of a pressure variation, a base pressure, and a target ventilation.

In various forms, the therapy engine module 4320 comprises one or more of the following algorithms: phase determination 4321, waveform determination 4322, ventilation determination 4323, inspiratory flow limitation determination 4324, apnea/hypopnea determination 4325, snore determination 4326, airway patency determination 4327, target ventilation determination 4328, and therapy parameter determination 4329.

4.4.2.2.1 Determination of Apneas and Hypopneas

In one form of the present technology, the central controller 4230 executes an apnea/hypopnea determination algorithm 4325 for the determination of the presence of apneas and/or hypopneas.

In one form, the apnea/hypopnea determination algorithm 4325 receives as an input a respiratory flow rate signal Qr and provides as an output a flag that indicates that an apnea or a hypopnea has been detected.

In one form, an apnea will be said to have been detected when a function of respiratory flow rate Qr falls below a flow rate threshold for a predetermined period of time. The function may determine a peak flow rate, a relatively short-term mean flow rate, or a flow rate intermediate of relatively short-term mean and peak flow rate, for example an RMS flow rate. The flow rate threshold may be a relatively long-term measure of flow rate.

In one form, a hypopnea will be said to have been detected when a function of respiratory flow rate Qr falls below a second flow rate threshold for a predetermined period of time. The function may determine a peak flow, a relatively short-term mean flow rate, or a flow rate intermediate of relatively short-term mean and peak flow rate, for example an RMS flow rate. The second flow rate threshold may be a relatively long-term measure of flow rate. The second flow rate threshold is greater than the flow rate threshold used to detect apneas.

4.4.2.2.2 Determination of Snore

In one form of the present technology, the central controller 4230 executes one or more snore determination algorithms 4326 for the determination of the extent of snore.

In one form, the snore determination algorithm 4326 receives as an input a respiratory flow rate signal Qr and provides as an output a metric of the extent to which snoring is present.

The snore determination algorithm 4326 may comprise the step of determining the intensity of the flow rate signal in the range of 30-300 Hz. Further, the snore determination algorithm 4326 may comprise a step of filtering the respiratory flow rate signal Qr to reduce background noise, e.g., the sound of airflow in the system from the blower.

4.5 Air Circuit

An air circuit 4170 in accordance with an aspect of the present technology is a conduit or a tube constructed and arranged to allow, in use, a flow of air to travel between two components such as RPT device 4000 and the patient interface 3000 or 3800.

4.6 Humidifier

4.6.1 Humidifier Overview

Figure 1A:
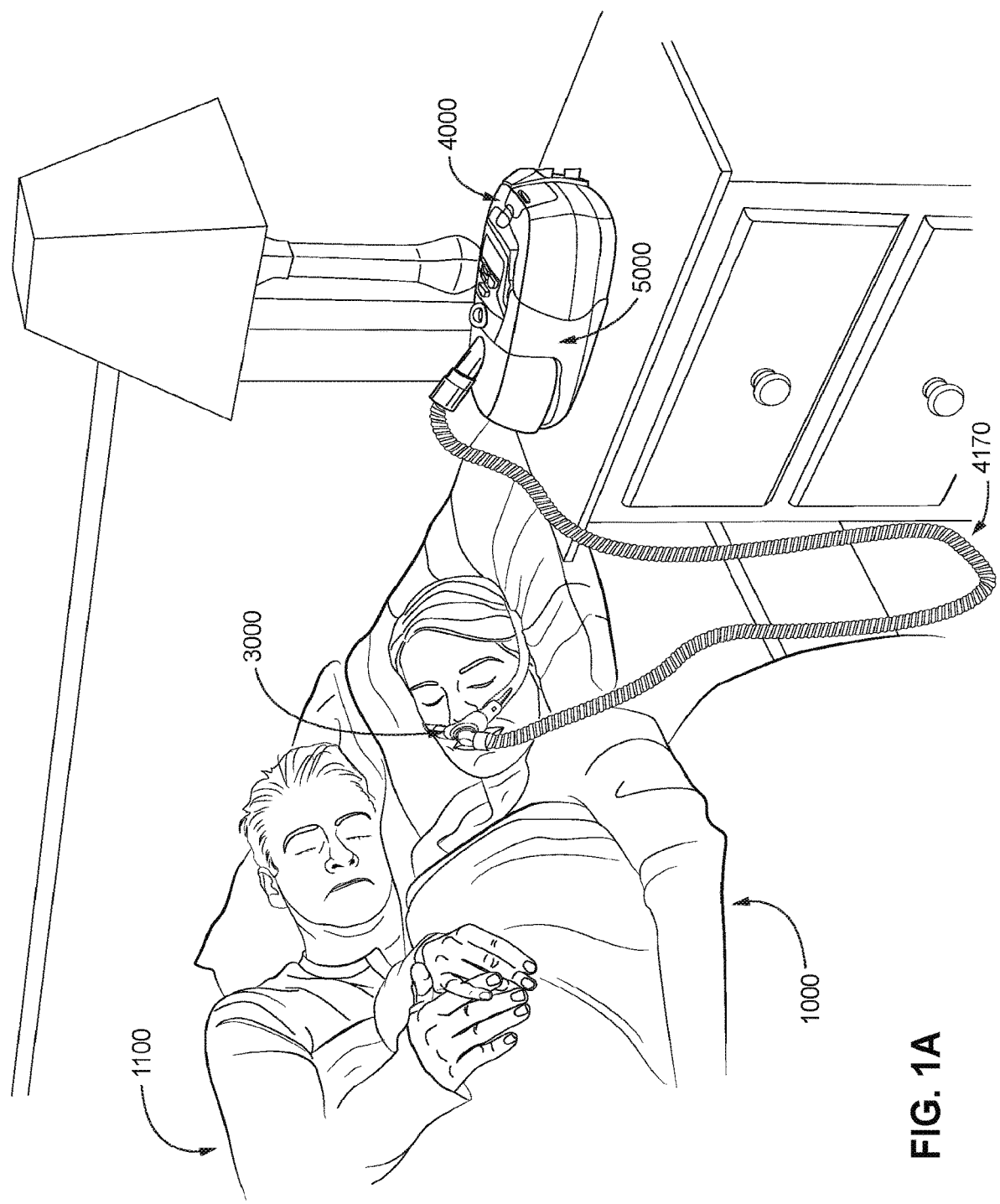
Figure 1C:
Figure 2A:
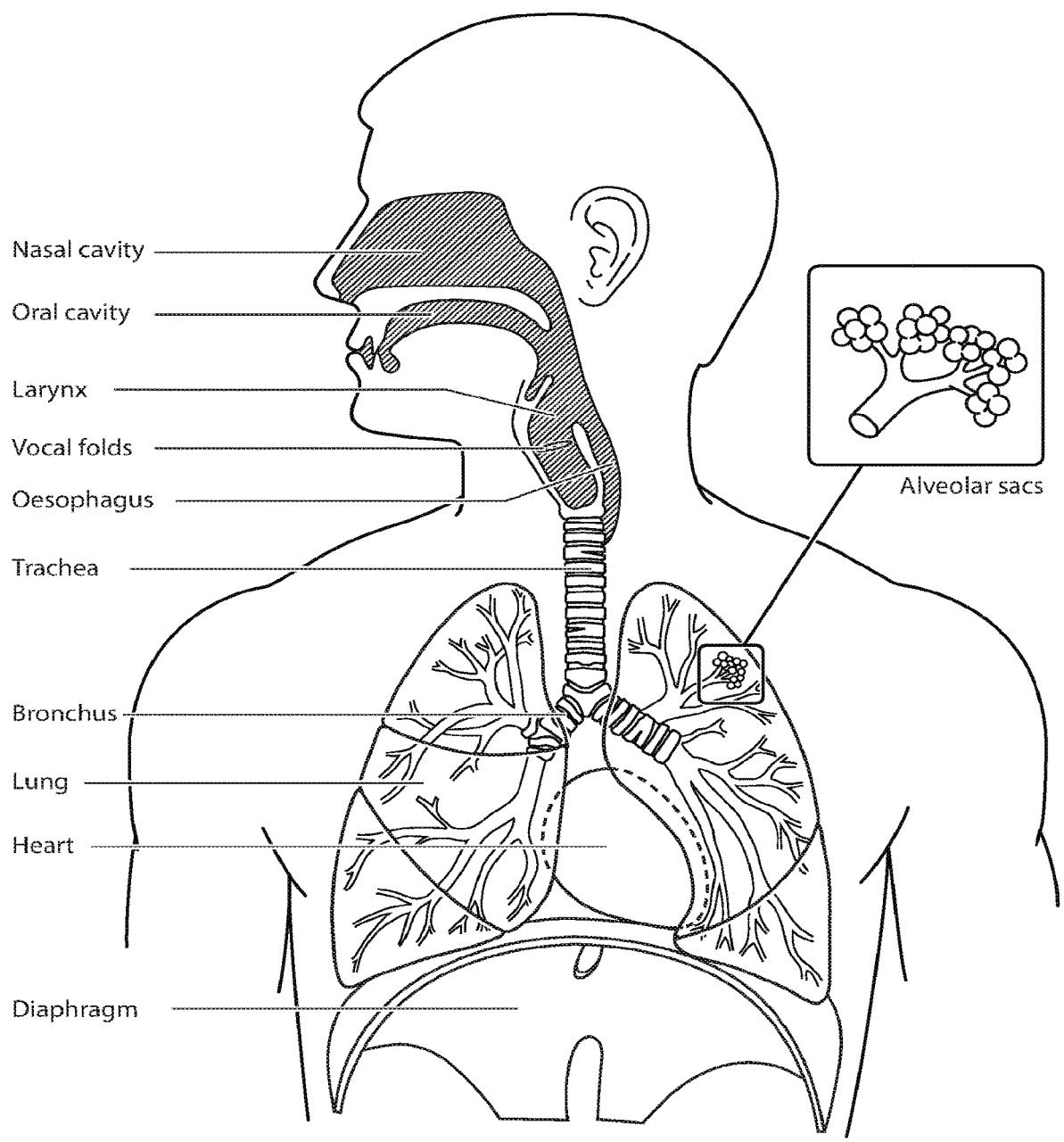
Figure 3A:
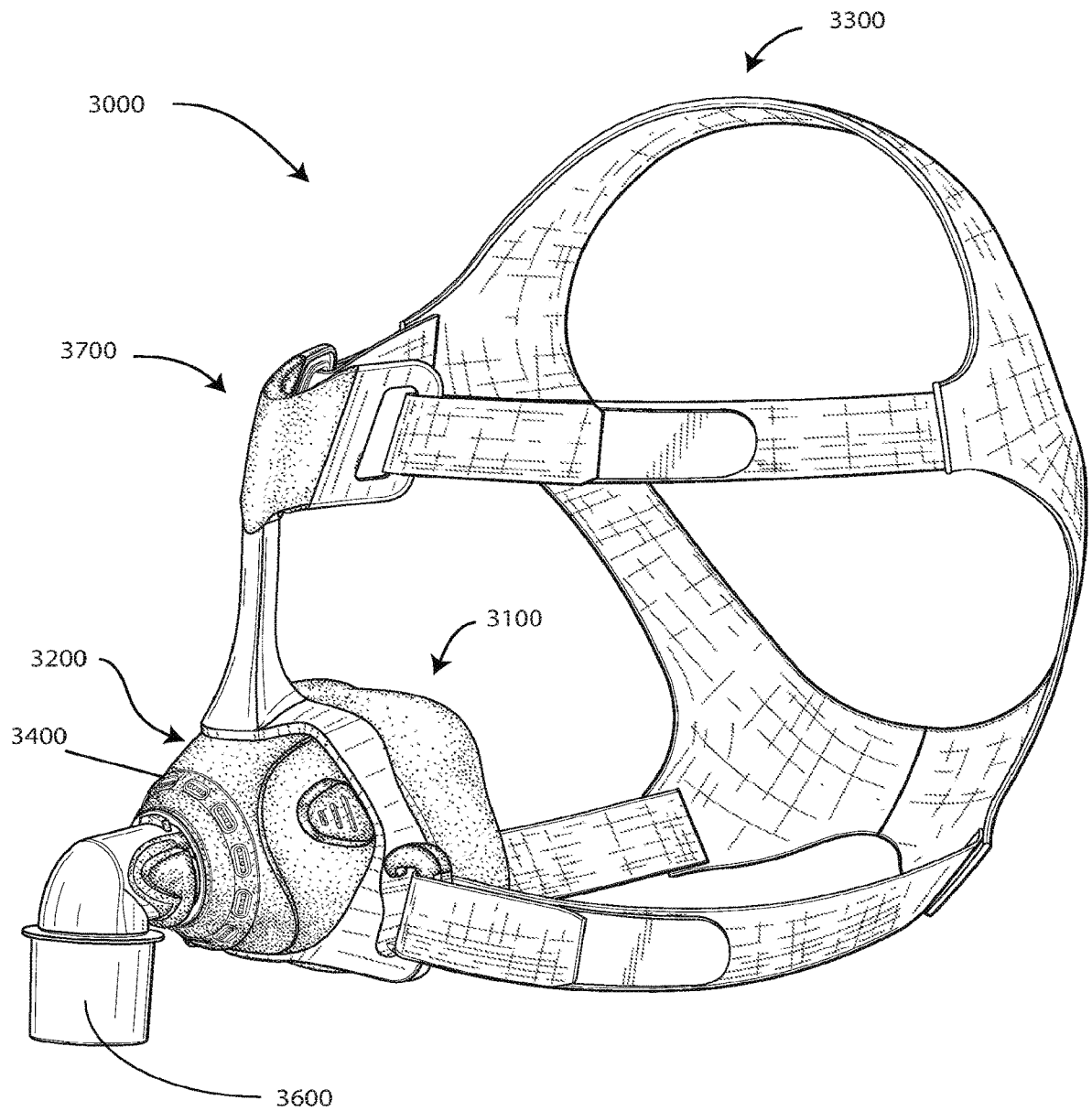
Figure 4A:
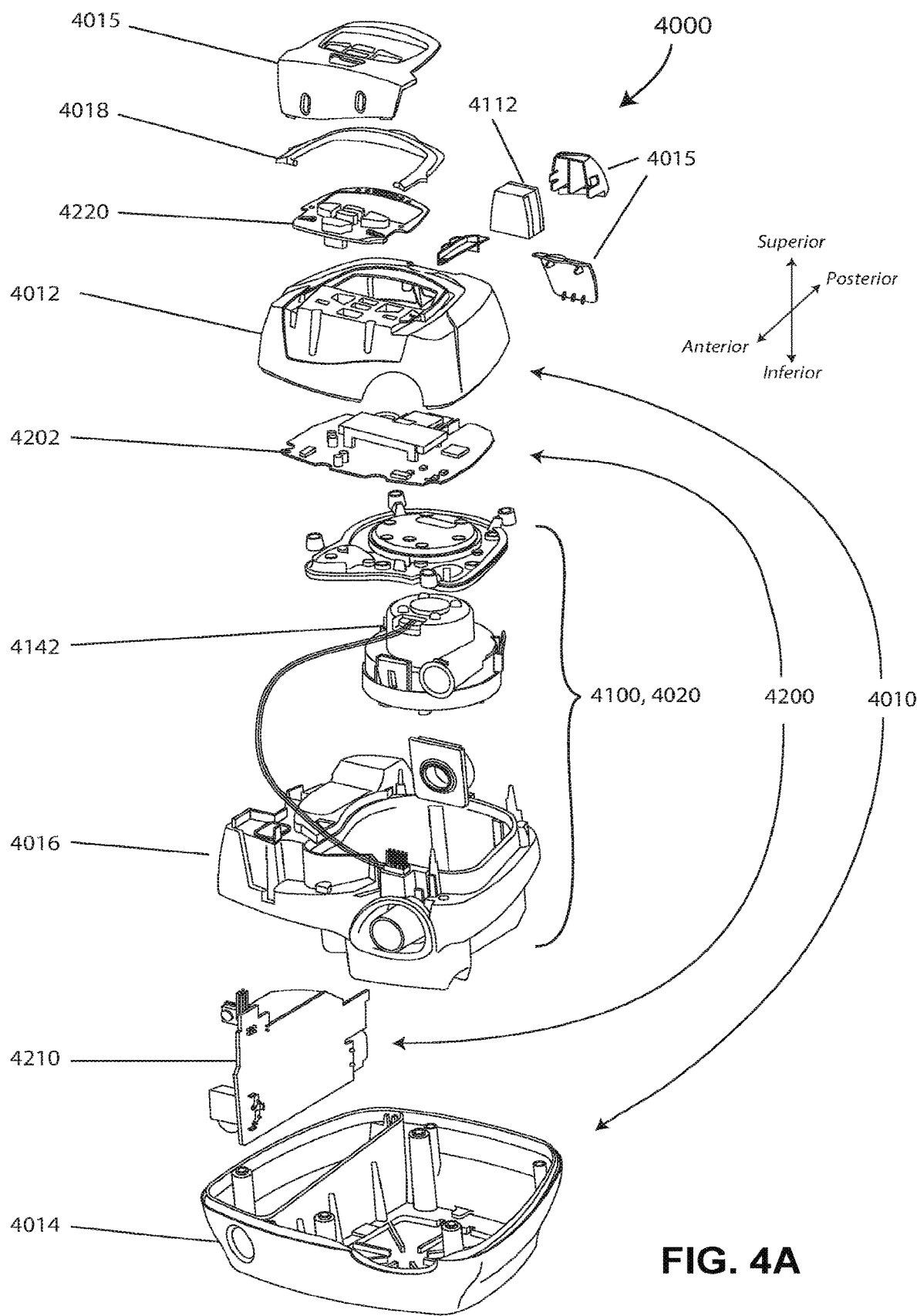
Figure 4B:
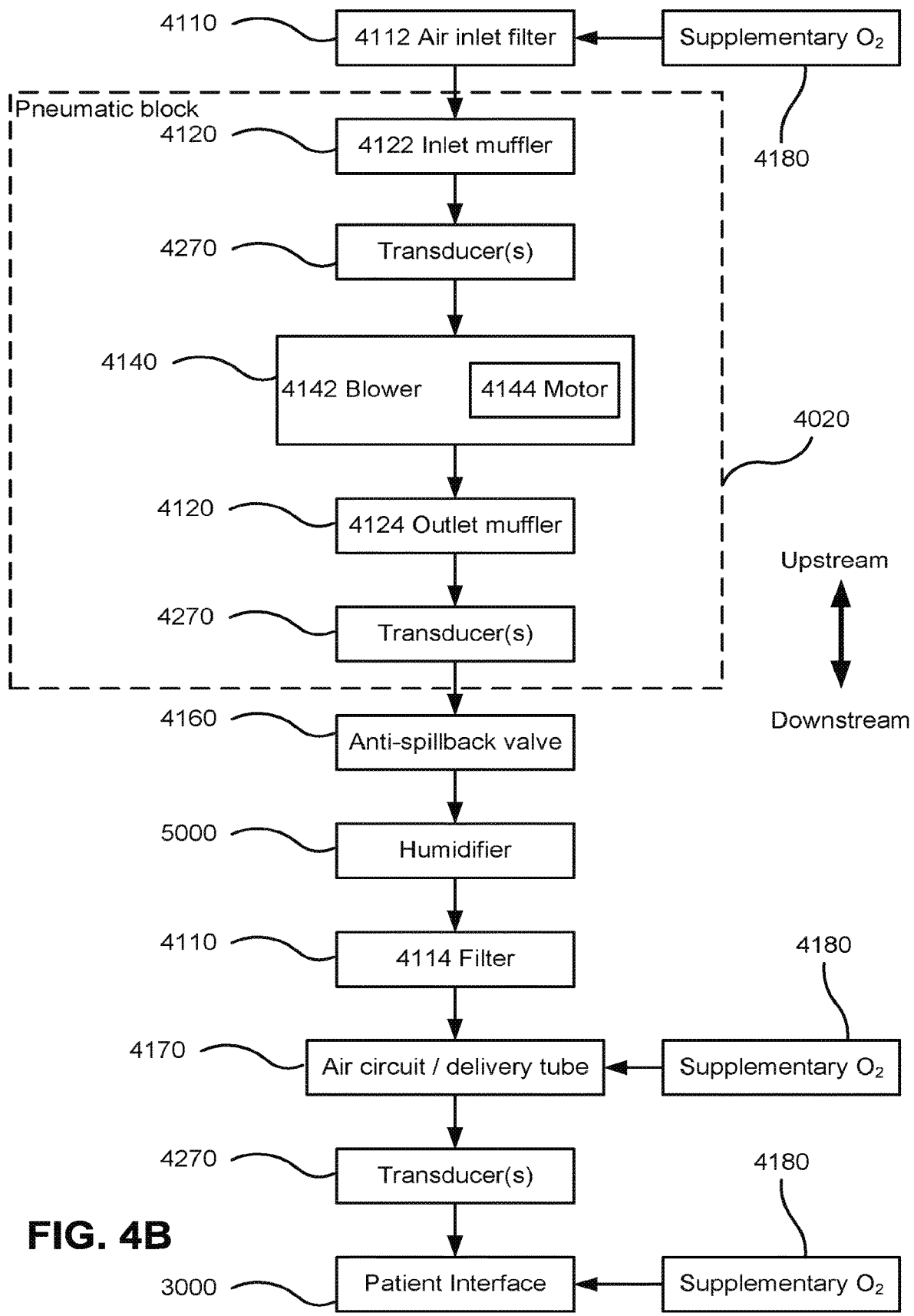
Figure 5A:
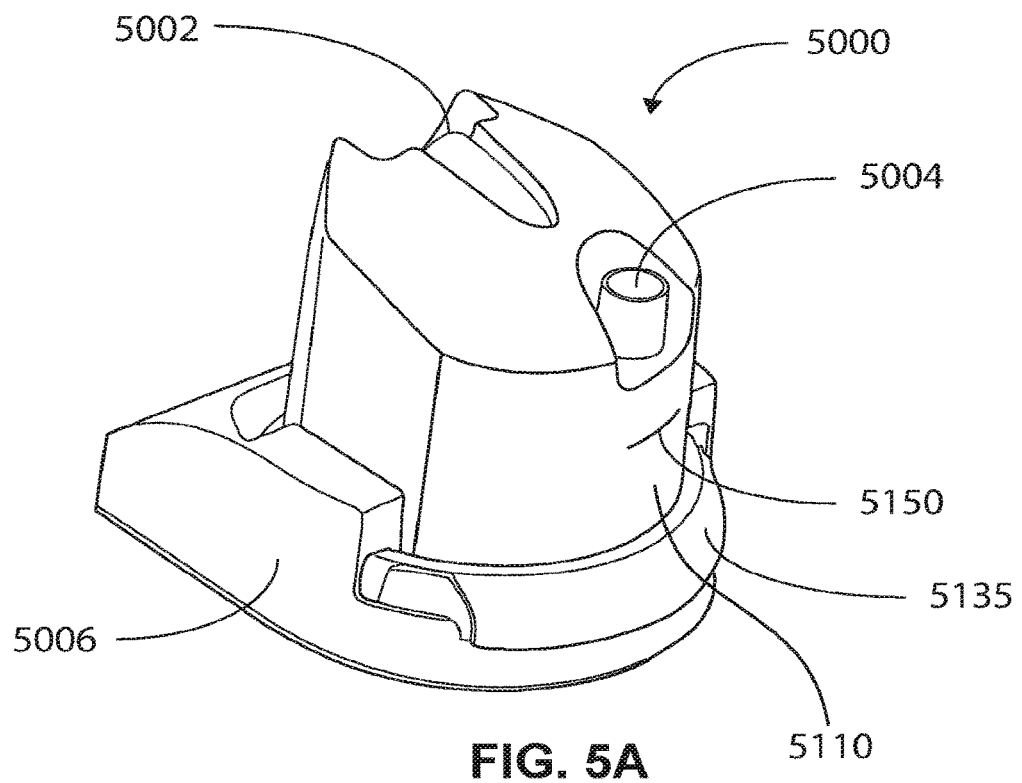
FIG. 5A shows an isometric view of a humidifier in accordance with one form of the present technology.

In one form of the present technology there is provided a humidifier 5000 (e.g. as shown in FIG. 5A) to change the absolute humidity of air or gas for delivery to a patient relative to ambient air. Typically, the humidifier 5000 is used to increase the absolute humidity and increase the temperature of the flow of air (relative to ambient air) before delivery to the patient's airways.

Figure 5B:
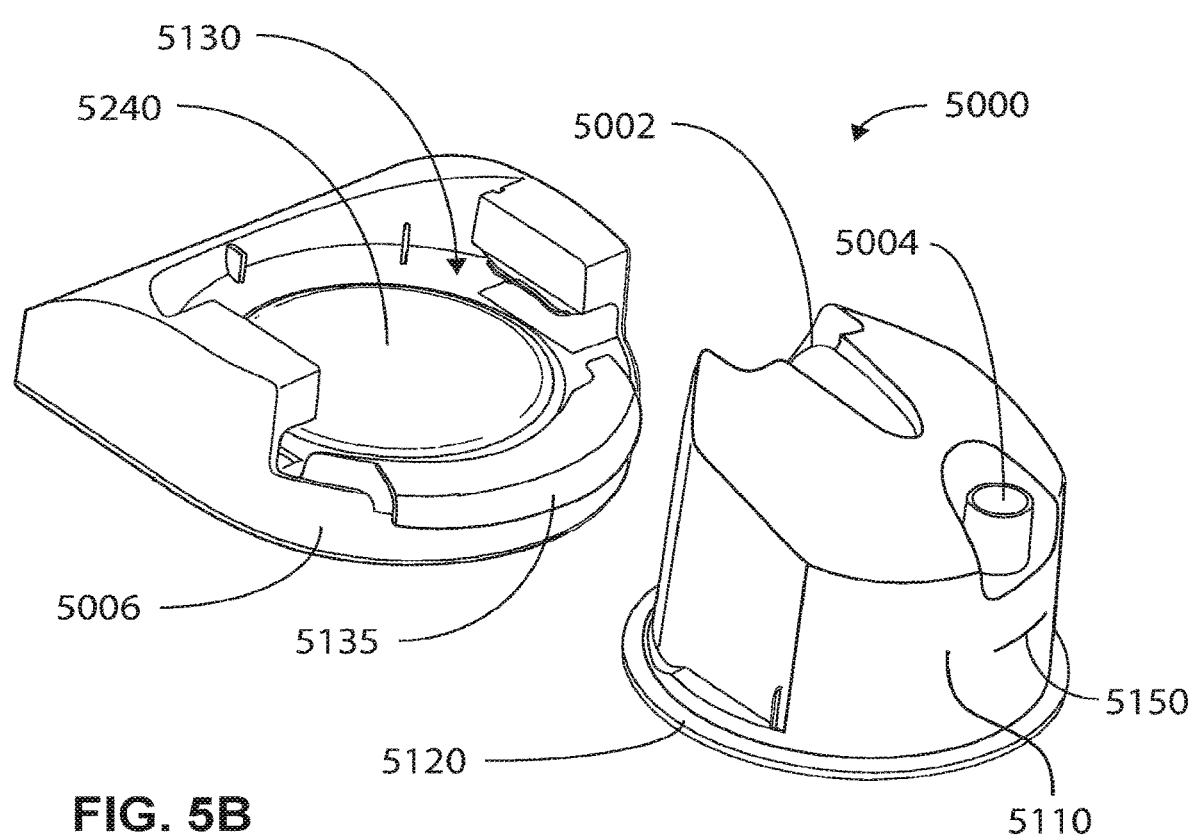
FIG. 5B shows an isometric view of a humidifier in accordance with one form of the present technology, showing a humidifier reservoir 5110 removed from the humidifier reservoir dock 5130.

The humidifier 5000 may comprise a humidifier reservoir 5110, a humidifier inlet 5002 to receive a flow of air, and a humidifier outlet 5004 to deliver a humidified flow of air. In some forms, as shown in FIG. 5A and FIG. 5B, an inlet and an outlet of the humidifier reservoir 5110 may be the humidifier inlet 5002 and the humidifier outlet 5004 respectively. The humidifier 5000 may further comprise a humidifier base 5006, which may be adapted to receive the humidifier reservoir 5110 and comprise a heating element 5240.

4.7 Breathing Waveforms

FIG. 6A shows a model typical breath waveform of a person while sleeping. The horizontal axis is time, and the vertical axis is respiratory flow rate. While the parameter values may vary, a typical breath may have the following approximate values: tidal volume Vt 0.5 L, inhalation time Ti 1.6 s, peak inspiratory flow rate Qpeak 0.4 L/s, exhalation time Te 2.4 s, peak expiratory flow rate Qpeak −0.5 L/s. The total duration of the breath, Ttot, is about 4 s. The person typically breathes at a rate of about 15 breaths per minute (BPM), with Ventilation Vent about 7.5 L/min. A typical duty cycle, the ratio of Ti to Ttot, is about 40%.

4.8 Screening, Diagnosis, Monitoring Systems

4.8.1 Polysomnography

FIG. 7A shows a patient 1000 undergoing polysomnography (PSG). A PSG system comprises a headbox 2000 which receives and records signals from the following sensors: an EOG electrode 2015; an EEG electrode 2020; an ECG electrode 2025; a submental EMG electrode 2030; a snore sensor 2035; a respiratory inductance plethysmogram (respiratory effort sensor) 2040 on a chest band; a respiratory inductance plethysmogram (respiratory effort sensor) 2045 on an abdominal band; an oro-nasal cannula 2050 with oral thermistor; a photoplethysmograph (pulse oximeter) 2055; and a body position sensor 2060. The electrical signals are referred to a ground electrode (ISOG) 2010 positioned in the centre of the forehead.

4.8.2 Non-Obtrusive Monitoring System

One example of a monitoring apparatus 7100 for monitoring the respiration of a sleeping patient 1000 is illustrated in FIG. 7B. The monitoring apparatus 7100 contains a contactless motion sensor generally directed toward the patient 1000. The motion sensor is configured to generate one or more signals representing bodily movement of the patient 1000, from which may be obtained a signal representing respiratory movement of the patient.

4.8.3 Respiratory Polygraphy

Respiratory polygraphy (RPG) is a term for a simplified form of PSG without the electrical signals (EOG, EEG, EMG), snore, or body position sensors. RPG comprises at least a thoracic movement signal from a respiratory inductance plethysmogram (movement sensor) on a chest band, e.g. the movement sensor 2040, a nasal pressure signal sensed via a nasal cannula, and an oxygen saturation signal from a pulse oximeter, e.g. the pulse oximeter 2055. The three RPG signals, or channels, are received by an RPG headbox, similar to the PSG headbox 2000.

In certain configurations, a nasal pressure signal is a satisfactory proxy for a nasal flow rate signal generated by a flow rate transducer in-line with a sealed nasal mask, in that the nasal pressure signal is comparable in shape to the nasal flow rate signal. The nasal flow rate in turn is equal to the respiratory flow rate if the patient's mouth is kept closed, i.e. in the absence of mouth leaks.

FIG. 8 is a block diagram illustrating a screening/diagnosis/monitoring device 7200 that may be used to implement an RPG headbox in an RPG screening/diagnosis/monitoring system. The screening/diagnosis/monitoring device 7200 receives the three RPG channels mentioned above (a signal indicative of thoracic movement, a signal indicative of nasal flow rate, and a signal indicative of oxygen saturation) at a data input interface 7260. The screening/diagnosis/monitoring device 7200 also contains a processor 7210 configured to carry out encoded instructions. The screening/diagnosis/monitoring device 7200 also contains a non-transitory computer readable memory/storage medium 7230.

Memory 7230 may be the screening/diagnosis/monitoring device 7200's internal memory, such as RAM, flash memory or ROM. In some implementations, memory 7230 may also be a removable or external memory linked to screening/diagnosis/monitoring device 7200, such as an SD card, server, USB flash drive or optical disc, for example. In other implementations, memory 7230 can be a combination of external and internal memory. Memory 7230 includes stored data 7240 and processor control instructions (code) 7250 adapted to configure the processor 7210 to perform certain tasks. Stored data 7240 can include RPG channel data received by data input interface 7260, and other data that is provided as a component part of an application. Processor control instructions 7250 can also be provided as a component part of an application program. The processor 7210 is configured to read the code 7250 from the memory 7230 and execute the encoded instructions. In particular, the code 7250 may contain instructions adapted to configure the processor 7210 to carry out methods of processing the RPG channel data provided by the interface 7260. One such method may be to store the RPG channel data as data 7240 in the memory 7230. Another such method may be to analyse the stored RPG data to extract features. The processor 7210 may store the results of such analysis as data 7240 in the memory 7230.

The screening/diagnosis/monitoring device 7200 may also contain a communication interface 7220. The code 7250 may contain instructions configured to allow the processor 7210 to communicate with an external computing device (not shown) via the communication interface 7220. The mode of communication may be wired or wireless. In one such implementation, the processor 7210 may transmit the stored RPG channel data from the data 7240 to the remote computing device. In such an implementation, the remote computing device may be configured to analyse the received RPG data to extract features. In another such implementation, the processor 7210 may transmit the analysis results from the data 7240 to the remote computing device.

Alternatively, if the memory 7230 is removable from the screening/diagnosis/monitoring device 7200, the remote computing device may be configured to be connected to the removable memory 7230. In such an implementation, the remote computing device may be configured to analyse the RPG data retrieved from the removable memory 7230 to extract the features.

4.9 Data Transmission

FIG. 8 shows a block diagram illustrating one implementation of a data consent broker system according to the present technology. For instance, the system comprises one or several user devices 4000 that generate data and may be associated with a user or patient 1000 account. The patient 1000 account may be managed from a mobile device 120 or other computing device to login to a user's account on a service related to a device 4000.

The user device 4000 may then provide consent data 8000 to various third parties that would like to utilized the user's data. The consent data 8000 may include, among other things:
- a date and time stamp;
- the terms to which the user consents;
- third parties with which the user consents to share data;
- types of data the user consents to share;
- a time window consent is valid for; and
- and other relevant data.

The consent data may be provided by the user clicking accept on a user interface, specifying with checking boxes on a user interface or other ways on a computing device 120 what terms the user accepts.

The user devices 4000 that generate data may include a variety of user devices, including: medical devices, mobile devices, personal computers, laptops, CPAP machines and related software, humidifiers, other devices disclosed herein, wearables, software services running on various servers 7100 and computing devices, smart watches, smart scales, smart wrist bands, genetic data services, health data services, exercise equipment, and others.

Thus, the user data 10000 generated by the devices 4000 may include health data, genetic data, location data, metadata, therapy data, therapy settings, exercise data, profile data, age, weight, data from Electronic Health Records, sleep quality data, Apnea data, Hypopneas, date and time stamps, and other types of data. The data 10000 may be sent in packets with metadata to indicate the type of data being sent.

The consent management system also may include a consent system 8100 that includes a server 7100 and a database 7200. The database 7200 may include unique user identifiers referenced to the terms to which a user 1000 has consented, including: (1) types of data that may be shared, (2) types of data generating devices from which data may be shared, and (3) third parties to which the user 1000 has consented to share data 185. Furthermore, the consent system 8100 may store further data fields referenced to the unique user identifier including all of the relevant items discussed above with respect to user data 10000.

Additionally, third party systems 8200 that comprise at least a server 7100 and a database 7200 that are data consumers may also be connected to the consent system 8100 and the computing device 120 of the user 1000 over a network 7090. The network 7090 may be a wide area network 7090 such as an internet, intranet, the cloud, or the Internet. The connections to the network may be wired or wireless.

The patient computing device 120 may be a personal computer, mobile phone, tablet computer, or other device. The patient computing device 120 is configured to intermediate between the patient 1000 and the data server 7100 over the wide area network 7090.

In one implementation, this intermediation is performed by a software application program that runs on the patient computing device 120. The patient program may be a dedicated application referred to as a "patient application" that interacts with a complementary process hosted by the data server 7100. In another implementation, the patient program is a web browser that interacts via a secure portal with a web site hosted by the data server 7100. In yet another implementation, the patient program is an email client.

In other examples, the data generating device 4000 communicates with the patient computing device 120 via a local (wired or wireless) communication protocol such as a local network protocol (e.g., Bluetooth). In the alternative implementation, the patient computing device 120 via the patient program, is configured to intermediate between the patient 1000 and the data server 7100, over the network 7090, and also between the data generating device 4000 and the data server 7100 over the network 7090.

Consent data 8000 from user 1000 computing devices 120 may be sent to the third party system 8200 and store on its database 7200, so that the third party system 8200 can determine which devices 4000 it may download data from and the types of data that may be used and stored, etc.

FIG. 9 is flow chart showing an example method of managing consent. For instance, first the consent system 8100 may receive a request from a third party to access a user's data 9000. Accordingly, in this case, the third party does not have to send a notification to the user 1000 computing device 120 to ask the user separately for consent. Rather, the third party may send a data packet to the consent system 8100 and the consent system 8100 can respond with whether or not the user 1000 has consented to share the data.

The request may include a type of data, a user identifier, a user device type or other parameters that comprise a request for consent to download data from the user computing device 120 or user data generating devices 4000. In other examples, the request may only include a user identifier, and the consent system 8100 may send back consent data 8000 with a summary of the consent terms to which the user 1000 has already agreed.

In some examples, after the request is received from the third party 9000, the system 8100 may query the database 7200 to determine whether the user identifier exists in the database 7200, and what types of consent is referenced to the user identifier 9100. For instance, the consent system 8100 may retrieve the consent data 9100 referenced to the user identifier that comprises the data types 9450 the user has consented to share, authorized third parties 9460, and authorized user devices 9470. Authorized user devices 9470 may be specified by various addresses, MAC addresses, or other identifiers.

Next, the system 8100 may respond 9200 to the third party system 8200 by sending consent data 8000 from the server 7200 of the consent system 8100 to the server 7100 of the system party system 8200. This may include the types of consent the user has agreed to, or may simply return true or false whether or not the third party system 8200 may download and use data from user device 4000.

Accordingly, the third party system 8200 may then download data from the user device 4000 if consent is confirmed in a variety of ways over the network 7090. This may continue for a period of time, a predetermined window of time or indefinitely.

In some examples, the user 1000 will indicate on their computing device 120 that they wish to revoke previously given consent, and send 9300 the revoking consent data 8000 to the consent system 8100. Then, the consent system 8100 may determine which third party systems 8200 to send the revoking 9400 consent data 8000. The revoking consent data 8000 may include any combination of data fields including a global revoke for that third party 8200 and user data 10000, or a certain type or use of the data 10000.

FIG. 10 illustrates an additional system that represents another embodiment of the present disclosure. In this embodiment, the user data 10000 is routed through the consent system 8100 rather than transferring directly from the user computing device 120 or user data generating device 4000 to the third party 8200. This is advantageous, because this allows the consent system 8100 to effectively manage the consent process, revoke consent more easily by turning off the data flow, increase the ability to anonymize data sources and users associated with data sources, and allows the consent system 8100 to act as a market to sell data.

FIG. 11 illustrates a flow chart showing an example method for implementing the consent system of FIG. 10. For instance, the consent system 8100 may send requests to the user device to request to consent to share data 11000. This may be a global request that includes multiple types of data, data consumers, end users, uses, sources of data, data generating devices. In other examples, it may include or be prompted by only one specific third party 8200 data consumer.

Then, the system 8100 may receive from the user computing device 120 a confirmation of consent to share data 11100 that may include the data type 9450, the time window consent is valid 9470 and other factors and information including in some cases with a specific requesting third party system 8200. Then, once consent is confirmed, the system 8100 may request and receive login data from the user's third party account 11200 for instance for a data generating device 4000.

This will allow the system's server 7100 to login and receive data 11300 from the data generating device 4000 or its associated account, or other services or software over the network 7090. Additionally, other embodiments could be implemented that similarly validate the user's 1000 credential for their account and download the data 11300.

Next, the system 8100 and its server 7100 may process the data to determine the type of data 11400 and other relevant features of the data. This may include categories of data that are referenced to the types of consent, for instance location data, profile data, medical history, etc. In some examples, this could be performed with machine learning or other algorithms that identify formats of GPS coordinates for instance. In other examples, the system 8100 will process header information or other metadata to determine the type of data.

Then, the data will be stored in the consent database 7200 referenced to the user identifier 11500 in some examples, or only referenced to a type of data or a data source. In some instances, various other tags will be applied to the data so that the database 7200 can be queried like a market place, to determine the types and quantities of data available to third party system 8200 data consumers.

Consent System as Data Pipe

FIG. 12 illustrates a flow chart illustrating an example of a method for facilitating transfer of data from the user data generating device 4000 to the third party data consumer once consent is granted and confirmed for a specific third party. For instance, in some above examples, the consent system 8100 may simply manage consent, or the system may upload data 10000 from multiple users 1000 in order to aggregate and increase the value of the data.

However, if the system uploads the data 10000 from multiple users 1000 it would require relatively large amounts of database 7200 storage space. Accordingly, in other examples the consent system 8100 may act as the pipe to facilitate transfer of the data from the data generating device 4000 to the third party system 8200. In this example, the consent system 8100 will not be required to store large amounts of data but will still be able to closely manage the data flow, and easily revoke consent and prevent the transfer of further data once a user revokes consent.

For instance, the consent system 8100 may send an API address to the third party to access data generated by the data device 12000. Then, the system 8100 may facilitate the transfer of data generated by the data device to the third party through the API 12100. For instance, the third party 8200 may make periodic calls to the API address to request updates to the data and the system 8100 may then send or request additional data from the data device 4000. In other examples, the system may send the data periodically to the third party 8200 through the API.

In some examples, the system 8100 may process the data 10000 to identify the type of data (for instance from the metadata or the particular features of the data structures). In this case, the API or other internal processing software of the system 8100 may screen all or portions of the data generated by the user device 4000 before sending to the third party 8200. In some examples, certain information may be first removed from the data before sending it. This may include the user name or other identifying information that can be useful for complying with consent types of the user, or for complying with privacy laws related to patient data.

Data Marketplace

In some examples, the system 8100 may create a data marketplace, where it may present types of data and prices of that data to data consumers or third parties 8200. Then, the third parties 8200 can purchase types and amounts of data and in some cases, part of the purchase price may be paid to the user's 1000 for sharing their data 10000. In some examples, the system 8100 may aggregate or catalogue the types of data available for purchase, and determine various features of the data that may be relevant to data consumers to determine whether the data would be valuable to them including:

(1) data type (e.g., motion, location, etc.)
(2) data source
(3) profile characteristics (e.g. gender, age, etc.);
(4) consent characteristics associated with data; and
(5) other characteristics.

In some examples, the third party 8200 may send a data request including, for instance, the type of data requested, a threshold amount of data required, and a price the third party 8200 is willing to pay of the data. Then, the system 8100 may utilize a server 7100 to query its database 7200 to determine whether the request can be made, and the types, amounts, and price of any relevant data.

Then, in some examples, the system 8100 may send a notification to the third party 8200 that includes the available data and price. The third party 8200 may then accept or decline the request, or in other examples, if the data identified on the database 7200 meets the requirements of the third party 8200, the system 8200 may automatically send the data (or send an API for access as described above).

In some examples, the system 8100 may store open requests for data 10000 from third parties 8200 and every time a new user 1000 uploads or provides consent to share data 10000, the system 8100 may determine whether the new data meets the requirements of any open requests. Then, if any open requests are met, the new data 10000 may be sent to the respective third parties 8200.

Selected Embodiments

Although the above description and the attached claims disclose a number of embodiments of the present invention, other alternative aspects of the invention are disclosed in the following further embodiments.

Embodiment 1. A system for managing consent, the system comprising: a consent database with a user ID comprising a unique identifier for a user account referenced to: a set of types of data the user has consented to share; a set of devices from which the user has consented to share the data generated by those devices; a set of consumers the user has consented to share data with; a memory containing machine readable medium comprising machine executable code having stored thereon instructions for performing a method; a control system coupled to the memory comprising one or more processors, the control system configured to execute the machine executable code to cause the control system to: receive a request from a consumer to access data from the user comprising a time stamp, user ID associated with an account, and a first type of data; query the consent database to access the user ID and determine whether the user associated with the user ID has consented to share the first type of data; and send, to the consumer, a response indicating whether the consumer is authorized to access the first type of data from the account referenced to the user ID.

Embodiment 2. The system of embodiment 1, wherein the control system is further configured to: receive, from the user, a request indicating the user has revoked consent to share the first type of data; and send to the consumer, a notification indicating the user has revoked consent to share the first type of data.

Embodiment 3. The system of embodiment 2, wherein the control system is further configured to: send, to the user, a request to renew consent; receive, from the user, a confirmation to renew consent; and send to the consumer a notification indicating the user has renewed consent.

Embodiment 4. The system of embodiment 1, wherein the control system is further configured to: send, to the consumer, an address where the consumer may access the first type of data; receiving, a request from the consumer to access the first type of data at the address, and establishing, a link between the consumer and a user database comprising the first type of data stored in reference to the user ID and sending a set of the first type of data to the consumer.

Embodiment 5. The system of embodiment 1, wherein the first type of data is profile data, mobile data, location data, health data, respiratory therapy data, vital sign data, wearable data, heart related wearable data, steps data, genetic data, social media usage data, workout data, or fitness data.

Embodiment 6. The system of embodiment 1, wherein the types of devices include a mobile phone, a wearable fitness tracker, a heart rate monitoring watch, a pulse oximeter, or a respiratory therapy device.

Embodiment 7. The system of embodiment 1, wherein the consent database further comprises a market rate referenced to each type of data stored.

Embodiment 8. The system of embodiment 1, wherein each of the set of consumers are each referenced to an address.

Embodiment 9. A system for managing data access for third parties, the system comprising: a consent database with a user ID comprising a unique identifier for a user accounts referenced to: a set of data the user has consented to share comprising at least a first and second type of data; a set of devices from which the user has consented to share the data generated by those devices; a memory containing machine readable medium comprising machine executable code having stored thereon instructions for performing a method; a control system coupled to the memory comprising one or more processors, the control system configured to execute the machine executable code to cause the control system to: send, to a user device associated with the user ID, a request for consent to share data; receiving, from the user device, a confirmation of consent to share data, the confirmation of consent comprising: a consent to share the first type of data; and a time window the consent to share is valid; receiving, from the user device, login information for a third party account associated with the user ID and a first data device; sending to the first data device a request to retrieve data; receiving a first set of data from the first data device; processing the first set of data to identify a set the first type of data; and storing the set of the first type of data in the consent database referenced to the user ID.

Embodiment 10. The system of embodiment 9, wherein processing the first set of data to identify a set of the first type of data further comprises processing the data to identify GPS coordinates.

Embodiment 11. The system of embodiment 10, wherein processing the first set of data to identify a set of the first type of data further comprises processing the data to identify data output from an accelerometer, gyroscope, or magnetometer.

Embodiment 12. The system of embodiment 10, wherein the control system is further configured to: query a consumer database that references a set of consumers and data receipt addresses to types of data each consumer has agreed to receive within a threshold market price to identify any of the set of consumers that has agreed to receive the first type of data at the current market price for the first type of data; and send the set of the first type of data to any of the identified consumers of the set of consumers at the referenced data receipt address.

Embodiment 13. The system of embodiment 12, wherein the consumer database references specific characteristics of types of data that must be included in order to receive the data at the market price.

Embodiment 14. The system of embodiment 13, wherein the characteristics include height, weight, and age.

Embodiment 15. The system of embodiment 13, wherein the characteristics include heart rate data.

Embodiment 16. The system of embodiment 14, wherein the characteristics genetic data.

Embodiment 17. The system of embodiment 14, wherein the characteristics a combination of genetic data and heart rate data.

Embodiment 18. A system for managing consent, the system comprising: a consent database with a user ID comprising a unique identifier for a user account referenced to: a set of types of data the user has consented to share; a set of devices from which the user has consented to share the data generated by those devices; a set of consumer devices the user has consented to share data with; a memory containing machine readable medium comprising machine executable code having stored thereon instructions for performing a method; a control system coupled to the memory comprising one or more processors, the control system configured to execute the machine executable code to cause the control system to: receive a request from a first of the set of consumer devices to access data from the user comprising a time stamp, user ID associated with an account, and a first type of data; query the consent database to access the user ID and determine whether the user associated with the user ID has consented to share the first type of data with the first of the set of consumer devices; and send, to the first of the set of consumer devices, a response indicating whether the first of the set of consumer devices is authorized to access the first type of data from the account referenced to the user ID.

Embodiment 19. The system of embodiment 18, wherein the control system is further configured to: receive, from the user, a request indicating the user has revoked consent to share the first type of data; and send to the first of the set of consumer devices, a notification indicating the user has revoked consent to share the first type of data.

Embodiment 20. The system of embodiment 19, wherein the control system is further configured to: send, to the user, a request to renew consent; receive, from the user, a confirmation to renew consent; and send to the first of the set of consumer devices, a notification indicating the user has renewed consent.

Embodiment 21. The system of embodiment 20, wherein the control system is further configured to: send, to the first of the set of consumer devices, an address where the first of the set of consumer devices may access the first type of data; receiving, a request from the first of the set of consumer devices to access the first type of data at the address, and establishing, a link between the first of the set of consumer devices and a user database comprising the first type of data stored in reference to the user ID and sending a set of the first type of data to the first of the set of consumer devices.

Embodiment 22. The system of embodiment 20, wherein the first type of data is profile data, mobile data, location data, health data, respiratory therapy data, vital sign data, wearable data, heart related wearable data, steps data, genetic data, social media usage data, workout data, or fitness data.

Embodiment 23. The system of embodiment 20, wherein the control system is further configured to: store in the consent database the first of the set of consumer devices as an authorized data consumer referenced to the user ID and a time window for the consent; sending, to the first of the set of consumer devices, a notification that the consent has been revoked once the time window has expired.

Embodiment 24. The system of embodiment 18, wherein the types of devices include a mobile phone, a wearable fitness tracker, a heart rate monitoring watch, a pulse oximeter, or a respiratory therapy device.

Embodiment 25. The system of embodiment 18, wherein the consent database further comprises a market rate referenced to each type of data stored.

Embodiment 26. The system of embodiment 18, wherein each of the set of consumer devices are each referenced to an address.

Embodiment 27. A method comprising: receiving, a request from a consumer to access data from the user comprising a time stamp, user ID associated with an account, and a first type of data; querying a consent database to access the user ID and determine whether the user associated with the user ID has consented to share the first type of data; and sending, to the consumer, a response indicating whether the consumer is authorized to access the first type of data from the account referenced to the user ID.

Embodiment 28. The method of embodiment 27, further comprising: receiving, from the user, a request indicating the user has revoked consent to share the first type of data; and sending to the consumer, a notification indicating the user has revoked consent to share the first type of data.

Embodiment 29. The method of embodiment 27, further comprising: sending, to the user, a request to renew consent; receiving, from the user, a confirmation to renew consent; and sending to the consumer a notification indicating the user has renewed consent.

Embodiment 30. The method of embodiment 27, further comprising: sending, to the consumer, an address where the consumer may access the first type of data; receiving, a request from the consumer to access the first type of data at the address, and establishing, a link between the consumer and a user database comprising the first type of data stored in reference to the user ID and sending a set of the first type of data to the consumer.

Embodiment 31. The method of embodiment 27, wherein the first type of data is profile data, mobile data, location data, health data, respiratory therapy data, vital sign data, wearable data, heart related wearable data, steps data, genetic data, social media usage data, workout data, or fitness data.

Embodiment 32. The method of embodiment 27, further comprising: storing in the consent database, the consumer as an authorized data consumer referenced to the user ID and a time window for the consent; sending, to the consumer, a notification that the consent has been revoked once the time window has expired.

Embodiment 33. The method of embodiment 27, wherein the types of devices include a mobile phone, a wearable fitness tracker, a heart rate monitoring watch, a pulse oximeter, or a respiratory therapy device.

Embodiment 34. The method of embodiment 27, wherein the consent database further comprises a market rate referenced to each type of data stored.

Embodiment 35. The method of embodiment 27, wherein each of the set of consumers are each referenced to an address.

Embodiment 36. A computer program product comprising instructions which, when executed by a control system, cause the computer to carry out the method of any one of embodiments 27 to 35.

Embodiment 37. The computer program product of embodiment 36, wherein the computer program product is a non-transitory computer readable medium.

The invention claimed is:

1. A system for managing consent, the system comprising:
   a consent database with a user ID comprising a unique identifier for a user account referenced to:
      a set of types of data the user has consented to share;
      a set of devices from which the user has consented to share the data generated by those devices;
      a set of consumers the user has consented to share data with; and
      a price for the data and a market rate referenced to each type of data stored;
   a memory containing machine readable medium comprising machine executable code having stored thereon instructions for performing a method;
   one or more processors coupled to the memory and configured to execute the machine executable code to cause the one or more processors to:
      remove information identifying the user;
      catalogue the set of types of data based on features relevant to at least one of the set of consumers;
      receive a request from a consumer to access data from the user comprising a time stamp, user ID associated with an account, and a first type of data;
      query the consent database to access the user ID and determine whether the user associated with the user ID has consented to share the first type of data;
      send, to the consumer, a response indicating a price for the first type of data from the account referenced to the user ID; and responsive to receiving, from the consumer, a request to purchase the first type of data, process a payment from the consumer and transmit the first type of data to the consumer; and an application executing on a user device of the set of devices storing the first type of data, wherein the application is configured to:

send, to the consumer, an address where the consumer may access the first type of data;

receive a request from the consumer to access the first type of data at the address;

establish a link between the consumer and a user database comprising the first type of data stored in reference to the user ID and send a set of the first type of data to the consumer; and responsive to the request to purchase the first type of data, cause transmission of the first type of data to the consumer.

2. The system of claim 1, wherein the one or more processors are further configured to:

receive, from the user, a request indicating the user has revoked consent to share the first type of data; and send to the consumer, a notification indicating the user has revoked consent to share the first type of data.

3. The system of claim 1, wherein the one or more processors are further configured to:

send, to the user, a request to renew consent;

receive, from the user, a confirmation to renew consent; and send to the consumer a notification indicating the user has renewed consent.

4. The system of claim 1, wherein the first type of data is profile data, mobile data, location data, health data, respiratory therapy data, vital sign data, wearable data, heart related wearable data, steps data, genetic data, social media usage data, workout data, or fitness data.

5. The system of claim 1, wherein the one or more processors are further configured to:

store in the consent database the consumer as an authorized data consumer referenced to the user ID and a time window for the consent;

send, to the consumer, a notification that the consent has been revoked once the time window has expired.

6. The system of claim 1, wherein the types of devices include a mobile phone, a wearable fitness tracker, a heart rate monitoring watch, a pulse oximeter, or a respiratory therapy device.

7. The system of claim 1, wherein the consent database further includes a market rate referenced to each type of data stored.

8. The system of claim 1, wherein each of the set of consumers are each referenced to an address.

9. A method comprising:

storing, in a consent database, a user ID comprising a unique identifier for a user account referenced to (i) a set of types of data the user has consented to share, (ii) a set of devices from which the user has consented to share the data generated by those devices, (iii) a set of consumers the user has consented to share data with, and (iv) a price for the data and a market rate referenced to each type of data stored;

receiving, by a control system, a set of types of data that the user had consented to share with a consumer;

removing, by the control system, information identifying the user;

cataloguing, by the control system, the set of types of data based on features relevant to at least one of the set of consumers;

receiving, by the control system, a request from the consumer to access data from the user a time stamp, user ID associated with an account, and a first type of data;

querying, by the control system, the consent database to access the user ID and determine whether the user associated with the user ID has consented to share the first type of data;

sending, by the control system to the consumer, a response indicating a price for the first type of data from the account referenced to the user ID;

responsive to receiving, from the consumer, a request to purchase the first type of data, processing a payment from the consumer and transmit the first type of data to the consumer;

sending, by an application executing on a user device of the set of devices to the consumer, an address where the consumer may access the first type of data;

receiving, by the application, a request from the consumer to access the first type of data at the address;

establishing, by the application, a link between the consumer and a user database comprising the first type of data stored in reference to the user ID and send a set of the first type of data to the consumer; and responsive to the request to purchase the first type of data, causing transmission of the first type of data to the consumer.

10. The method of claim 9, further comprising:

receiving, from the user, a request indicating the user has revoked consent to share the first type of data; and sending to the consumer, a notification indicating the user has revoked consent to share the first type of data.

11. The method of claim 9, further comprising:

sending, to the user, a request to renew consent;

receiving, from the user, a confirmation to renew consent; and sending to the consumer a notification indicating the user has renewed consent.

12. The method of claim 9, wherein the first type of data is profile data, mobile data, location data, health data, respiratory therapy data, vital sign data, wearable data, heart related wearable data, steps data, genetic data, social media usage data, workout data, or fitness data.

13. The method of claim 9, wherein the one or more processors are further configured to:

store in the consent database the consumer as an authorized data consumer referenced to the user ID and a time window for the consent;

send, to the consumer, a notification that the consent has been revoked once the time window has expired.

14. The method of claim 9, wherein the types of devices include a mobile phone, a wearable fitness tracker, a heart rate monitoring watch, a pulse oximeter, or a respiratory therapy device.

15. The method of claim 9, wherein the consent database further includes a market rate referenced to each type of data stored.

16. The method of claim 9, wherein each of the set of consumers are each referenced to an address.

* * * * *